United States Patent [19]
Epstein et al.

[11] Patent Number: 5,127,019
[45] Date of Patent: Jun. 30, 1992

[54] LASER SYSTEMS

[75] Inventors: Harold M. Epstein, Columbus; Jeffrey L. Dulaney, Hilliard; David W. Sokol, Columbus, all of Ohio

[73] Assignee: Battelle Memorial Institute, Columbus, Ohio

[21] Appl. No.: 662,066

[22] Filed: Feb. 28, 1991

Related U.S. Application Data

[63] Continuation-in-part of Ser. No. 463,577, Jan. 11, 1990, abandoned, and a continuation-in-part of Ser. No. 626,587, Dec. 7, 1990, Pat. No. 5,075,893.

[51] Int. Cl.$^5$ .............................. H01S 3/081
[52] U.S. Cl. .................... 372/108; 372/27; 372/29
[58] Field of Search ............... 372/27, 29, 108

[56] References Cited

U.S. PATENT DOCUMENTS

| | | | |
|---|---|---|---|
| 3,747,019 | 7/1973 | Koechner et al. | 372/29 |
| 4,546,477 | 10/1985 | Richards | 372/12 |
| 4,707,838 | 11/1987 | Reule et al. | 372/29 |
| 4,725,787 | 2/1988 | Chandra | 372/27 |
| 4,872,181 | 10/1989 | Johnson et al. | 372/108 |
| 4,955,725 | 9/1990 | Johnson et al. | 372/108 |
| 5,018,163 | 5/1991 | Daunt et al. | 372/108 |
| 5,027,360 | 6/1991 | Nabors et al. | 372/29 |
| 5,076,251 | 12/1991 | D'Arcy | 372/29 |

Primary Examiner—Georgia Y. Epps
Attorney, Agent, or Firm—Philip M. Dunson; Barry S. Bissell

[57] ABSTRACT

Apparatus for improving properties of a solid material by providing shock waves therein. A laser oscillator 10a provides a plurality of pulses 112 of coherent radiation. The leading edge of each pulse is sharpened either by a metal foil 18 or by phase conjugation reflection means 18a, 18e including a stimulated Brillouin scattering cell 18d, 18e and optionally a Faraday isolator 18b. Each pulse is directed onto an amplifier 123 comprising first and second laser amplifier rods 23a, 23b in series. At least a major portion of the radiation 112 amplified by the first amplifier rod 23a is directed to the second amplifier rod 23b, where it is amplified and then directed to a surface of the solid material. Substantially uniform spatial amplitude is achieved in the radiation 112 in at least one of these ways: A pair of flashlamps 70, 71 are included with each laser amplifier rod 23a, 23b for pumping the rod; the axis of each flashlamp 70, 71 and the axis of the first rod 23a are substantially parallel to each other and substantially in the same (first) plane; and a (second) plane containing the axis of the second rod 23b and the parallel axes of its associated flashlamps 70, 71 is substantially perpendicular to the first plane; and/or the oscillator 10c provides a beam of unpolarized coherent radiation 12T in which the spatial amplitude pattern of each succeeding pulse is substantially a mirror image of the pattern in the pulse that preceded it, or is rotated about its axis by a predetermined smaller angle from the pattern in the pulse that preceded it.

30 Claims, 5 Drawing Sheets

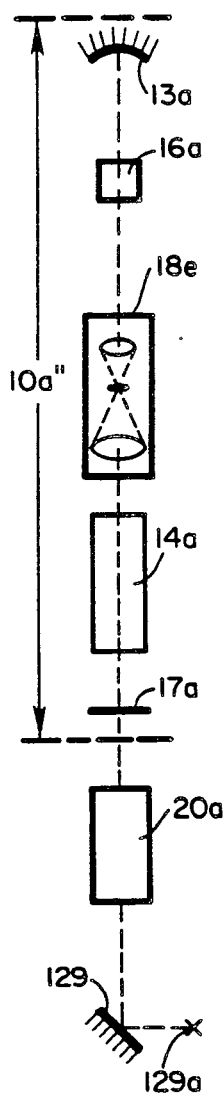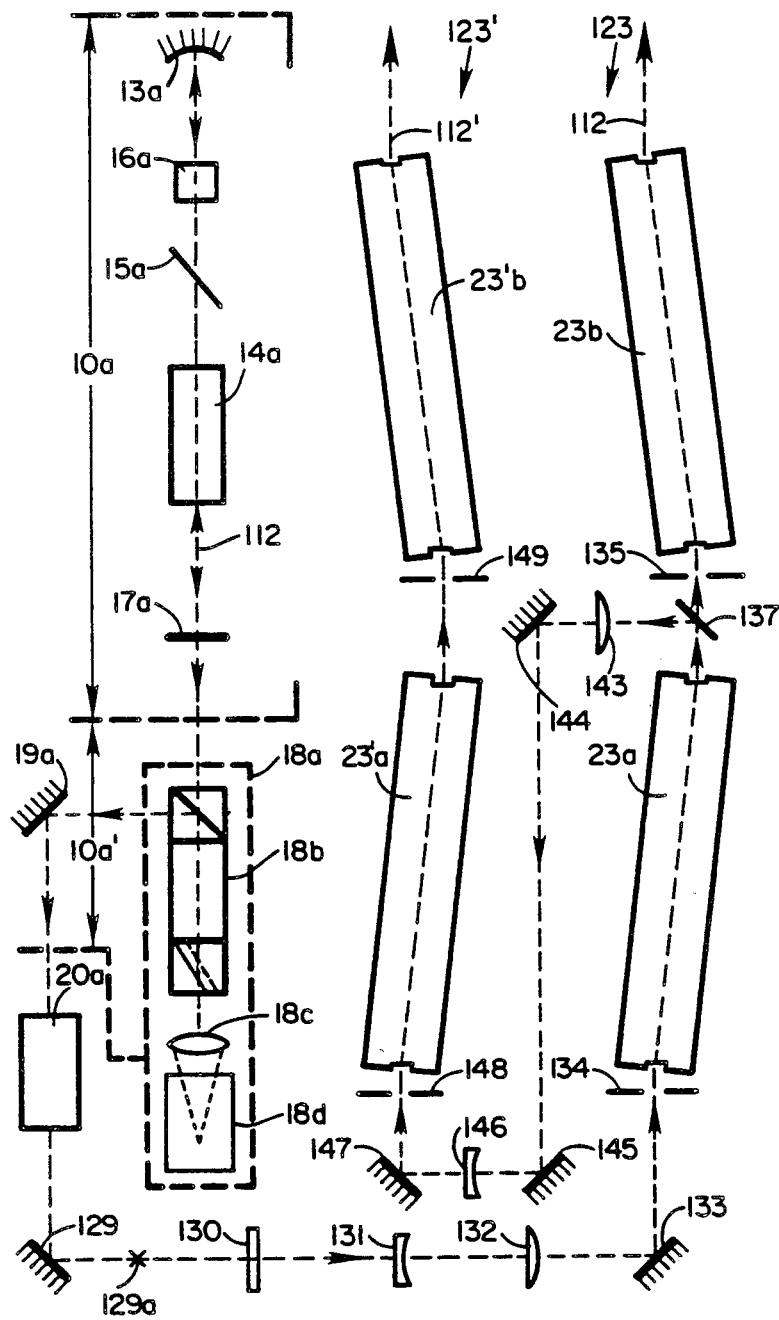
FIG. 11
FIG. 6

LASER SYSTEMS

This invention was made with Government support under Contract DAAH01-88-C-0481 awarded by the United States Army Missile Command. The Government has certain rights in this invention.

This application is a continuation-in-part of U.S. Pat. application Ser. No. 07/463,577, filed Jan. 11, 1990, of Harold M. Epstein, Allan H. Clauer, Boyd A. Mueller, Jeffrey L. Dulaney, Bernerd E. Campbell, and Craig T. Walters, for Improving Material Properties, now abandoned.

This application is also a continuation-in-part of U.S. Pat. application Ser. No. 07/626,587, filed Dec. 7, 1990, of Harold M. Epstein and Jeffrey L. Dulaney, for Unpolarized Laser Oscillators, now U.S. Pat. No. 5,075,893 issued Dec. 24, 1991.

FIELD

This invention relates to laser systems for providing coherent radiation pulses at high power. It has to do typically with high-power laser apparatus that is useful in systems such as those employed for improving properties of solid materials by providing shock waves therein. Such laser systems are especially useful for enhancing or creating desired physical properties such as hardness, strength, fatigue strength, corrosion resistance, etc, in metallic materials, and the improvement of welds between metal surfaces, etc.

The invention comprises significant improvements in the apparatus of U.S. Pat. No. 3,850,698, Nov. 26, 1974, of Philip J. Mallozzi and Barry P. Fairand, for Altering Material Properties. Another related patent is U.S. Pat. No. 4,401,477, Aug. 30, 1983, of Allan H. Clauer, Barry P. Fairand, Stephen C. Ford, and Craig T. Walters, for Laser Shock Processing.

BACKGROUND

As the Mallozzi and Fairand patent points out, old methods for the shock processing of solid materials typically involve the use of high explosive materials in contact with the solid, or high explosive materials are used to accelerate a plate that strikes the solid to produce shock waves therein. Such methods have several disadvantages. For example: (a) it is difficult and costly to shock process non-planar surfaces and complicated geometries, (b) storage and handling of the high explosive materials pose a hazard, (c) the processes are difficult to automate and thus fail to meet some industrial needs, and (d) the high explosive materials cannot be used in extreme environments such as high temperatures and high vacuum.

Shot peening is another widely known and accepted process for improving the fatigue, hardness, and corrosion resistance properties of materials by impact treatment of their surfaces. In shot peening, many small shot or beads are thrown at high speed against the surface of a material. The shot or beads sometimes escape from the treatment equipment and scatter in the surrounding area. Since particles might get into surrounding machinery and cause damage, shot peening usually cannot be used in a manufacturing line. Ordinarily it cannot be used on machined surfaces without damaging them.

Laser shock processing equipment, however, can fit right into manufacturing lines without danger to surrounding equipment. It is also readily adaptable to automatic control, making it further attractive for production line applications. It can be used on machined surfaces of harder metals and alloys with no damage to the surfaces.

The interaction of a pulsed laser beam with the surface of a material gives rise to a pressure pulse (shock wave) that propagates into the material and changes its properties. In the case of metals, for example, the changes in properties are caused by the introduction of cold work that increases the hardness and strength of the material. By appropriate tailoring of the peak pressure and width of the shock wave, it is possible to enhance selected material properties, such as fatigue strength, and at the same time not adversely affect other properties, such as corrosion resistance. It is possible also to shock process a finished piece of material without disturbing its surface, where a thin sacrificial layer of overlay material has been attached intimately onto the surface of the workpiece.

Shock processing with coherent radiation has several advantages over what has been done before. For example: (a) The source of the radiation is highly controllable and reproducible. (b) The radiation is easily focused on preselected surface areas and the operating mode is easily changed. This allows flexibility in the desired shocking pressure and careful control over the workpiece area to be shocked. (c) Workpieces immersed in hostile environments such as high temperature and high vacuum can be shock processed. (d) It is easy to shock the workpiece repetitively. This is desirable where it is possible to enhance material properties in a stepwise fashion. Shocking the workpiece several times at low pressures can avoid gross deformation and spallation of the workpiece. (e) The process is readily amenable to automation. (f) Nonplanar workpieces can be shock processed without the need of elaborate and costly shock focusing schemes.

Many publications have dealt with the use of lasers to provide stress waves in solids. Several such publications are cited and discussed in the first parent application, identified above, of which this is a continuation-in-part.

DISCLOSURE

In typical apparatus according to the present invention for improving properties of a solid material by providing shock waves therein, a laser oscillator 10a provides a plurality of pulses 112 of coherent radiation. The leading edge of each pulse is sharpened either by a metal foil 18 (FIG. 1) or by phase conjugation reflection means 18a (FIG. 6) or 18e (FIG. 11) including a stimulated Brillouin scattering (SBS) cell 18d,18e and optionally a Faraday isolator 18b.

Each pulse is directed from a preamplifier 20a via a mirror 129, a retarder plate 130, lenses 131,132, a mirror 133, and an iris 134, as a beam 112 having a predetermined diameter, onto an amplifier 123 comprising first and second laser amplifier rods 23a,23b in series. At least a major portion of the radiation 112 amplified by the first amplifier rod 23a is directed to the second amplifier rod 23b, where it is amplified and then directed to a surface of the solid material 11 (FIG. 1).

Substantially uniform spatial amplitude is achieved in the radiation 112 in at least one of these ways: A pair of flashlamps 70,71 (FIG. 7) are included with each laser amplifier rod 23a,23b for pumping the rod, the axis of each flashlamp 70,71 and the axis of the first rod 23a are substantially parallel to each other and substantially in the same horizontal plane; and the axis of the second rod 23b and the parallel axes of its associated flashlamps 20 70,71, continuing in approximately the same direction as the axis of the first amplifier rod 23a, define a vertical plane; and/or the oscillator 10c (FIGS. 12-14) provides a beam of coherent radiation 12T that is not polarized and in which each succeeding pulse is, in the spatial amplitude pattern of the beam, substantially a mirror image of the pattern in the pulse that preceded it (FIG. 12-13), and/or is rotated about its axis by a predetermined smaller angle from the pattern in the pulse that preceded it (FIGS. 14-15).

DRAWINGS

FIG. 6 is a schematic plan view of typical apparatus according to the invention that includes some useful features in addition to those disclosed in FIG. 1 and the description thereof.

FIG. 11 is a schematic plan view of alternative laser oscillator circuitry, including pulse sharpening means, that may replace part of the apparatus in FIG. 6.

CARRYING OUT THE INVENTION

Figure 1:
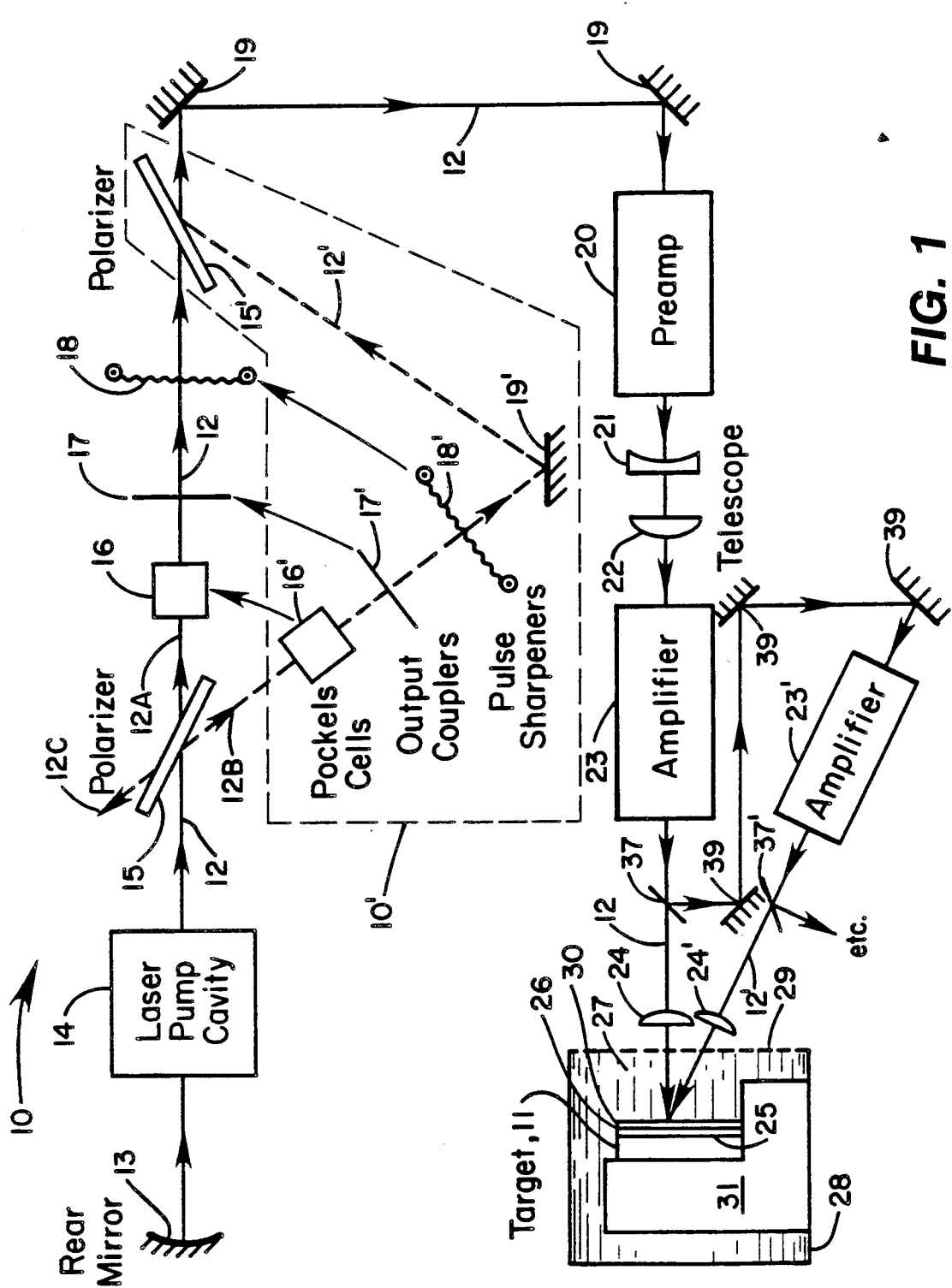
FIG. 1 is a schematic view illustrating typical embodiments of the present invention.

Referring now to FIG. 1, typical apparatus 10 is shown, suitable for practicing the present invention for improving properties of a metallic material in a target 11 by providing shock waves therein, and wherein there are directed to the surface of the material 11 a plurality of pulses of coherent radiation 12 having average energy fluence of at least about 10 Joules per square centimeter and rise time of not longer than about 5 nanoseconds within a fluorescence envelope lasting about 0.5 to 5 milliseconds, at a rate of about 1 radiation pulse per 100 to 200 microseconds.

In apparatus 10 for practicing the present invention, the components 15'-19' shown inside the dashed polygon 10' are optional. Embodiments that do not include these components will be described first.

Multiple Pulses, Fast Film Movement

The coherent radiation 12 is generated by an oscillator 13-17 comprising a rear mirror 13, a laser pump cavity 14, a polarizer 15, a pockels cell 16, and an output coupler 17. The laser pump cavity 14 comprises a gain medium, such as a neodymium-glass laser rod, pumped by flashlamps that are driven at regular intervals of about 0.1 to 10 seconds by a pulse forming network (PFN). One such laser pump cavity 14 that has been used conveniently in the apparatus 10 comprises the following components manufactured by Kigre, Inc. of Hilton Head, S.C.

FC-500/2 Laser Cavity, 8" arc length
¼ by 7.5" Q-98 Laser rod, 3% doping level, ends 1 degree opposed, antireflection coated at both ends.
Two Fluid-cooled Flashlamps
Model 883 Controller with integral 330 watt Power Supply.
Closed Cycle Cooling System The oscillator 13-17 provides an approximately rectangular fluorescence envelope lasting about 0.1 to 5 milliseconds. The coherent radiation 12 from the laser pump cavity 14 is linearly polarized. The polarizer 15 breaks the radiation 12 down into two linearly polarized orthogonal components; one of which (component B) it reflects away as indicated at 12B; and the other (component A) it transmits on, as indicated at 12A, to the pockels cell 16.

With a proper potential present across it (about 3,300 volts for a cell of transverse deuterated potassium dihydrogen phosphate), the pockels cell 16 retards the coherent radiation 12A one-fourth wavelength (90 degrees) while transmitting it on to the output coupler 17, which reflects about one-half of it back toward the polarizer 15. The reflected energy proceeds back through the pockels cell 16 with a further retardation of one-fourth wavelength (90 degrees). So the back radiation is one-half wavelength (180 degrees) out of phase with the forward radiation of component A, thus having the opposite polarization (B), and it is reflected away by the polarizer 15, as indicated at 12C, so as not to return to the laser pump cavity 14. Thus, laser energy builds up and is stored in the laser rod of the pump cavity 14, because oscillations cannot occur.

After at least about 100 microseconds, the potential across the pockels cell 16 is reduced to zero, typically by shorting it to ground, for about 1 to 5 microseconds; and the shorting of the pockels cell 16 is repeated at intervals of about 100 to 200 microseconds thereafter. While it is shorted, the pockels cell 16 does not retard the radiation 12, and the oscillator 13-17 produces about 2 to 50 laser pulses 12 in each fluorescence envelope, with sufficient time between pulses for stored energy to build up in the laser rod, while keeping fluorescent losses to a minimum.

The output coupler 17 comprises a partially reflective mirror that transmits about half of the energy in each pulse 12 on to the pulse sharpener 18 comprising a coating of aluminum about 150 to 5,000 angstroms thick on a supporting film that is substantially transparent and thin enough to be non-distorting to the radiation wavefront. The supporting film typically comprises a strong polyester material such as oriented, at least partially crystalline, polyethylene terephthalate, about 1 to 40 micrometers thick. One such material that we have used is Mylar, a product of E.I. du Pont de Nemours & Company. Mylar is birefringent, and its optical axis should be oriented to correspond with the polarization of the polarizers 15 and 15′.

The radiation pulse 12 strikes the aluminum film 18, typically vaporizing an area of about 0.1 to 0.2 square millimeters of the film in about 0.1 to 3 nanoseconds, after which the area of vaporization typically expands to about 1 to 1,000 square millimeters in about 2 to 10 nanoseconds. This sharpens the leading edge of the radiation pulse 12 passing through the hole where the film 18 has been vaporized away, and the modified pulse 12 is directed to a preamplifier 20. Where necessary or convenient, planar mirrors 19 may be included in the path of the radiation 12 to change or adjust the direction of the beam of radiation 12.

The preamplifier 20, which may be (and typically is) similar to the laser pump cavity 14, amplifies the radiation pulse 12, typically by about 3 to 10 decibels, and the amplified radiation 12 proceeds by way of a telescope, typically comprising a negative lens 21 and a positive lens 22, to an amplifier 23, which typically further amplifies the radiation pulse 12 by about 5 to 15 decibels. One amplifier 23 that has been used conveniently in the apparatus 10 comprises the following components manufactured by Kigre, Inc. of Hilton Head, S.C.

Power Amplifier Assembly, FA-1000/2
27 mm dia. × 810 mm long Q-89 Laser Rod (described hereinafter)
Two Fluid-cooled Lamps, 63 cm arc length
Model 886-2 Power Supply compatible with 883 Controller
Dual PFN assemblies
Coolant-to-water Cooling System The amplified radiation pulse 12 is focussed by a positive lens 24 onto a desired area of the surface 25 of the target 11, to provide an average energy fluence therein typically of at least about 10 (and preferably about 10 to 500) Joules per square centimeter, and an average power flux on the target of at least about $10^7$ (and preferably about $10^9$ to $10^{11}$) watts per square centimeter, with pulse lengths typically of about 10 to 1,000 nanoseconds. The maximum power flux will be limited by the formation of a reflecting plasma at the target surface. This maximum power flux will increase as the laser wavelength decreases. For example for a laser wavelength of 0.53 micrometer the maximum power flux will be approximately four times that for a wavelength of 1.06 micrometers.

A portion of the output 12 of the amplifier 23, typically about 10 percent, may be directed by a beam splitter 37 and mirrors 39 to a second similar amplifier 23′ to provide a second amplified radiation pulse 12′, focused by a positive lens 24′ onto a desired area of the surface 25 of the target 11 simultaneously with the pulse 12 from the amplifier 23. In the same way, a portion of the output 12′ from the amplifier 23′ may be directed by a beam splitter 37′ etc, and any convenient number of amplifiers may be employed similarly to provide additional pulses to the target 11.

Typically pulses from the different amplifiers are directed to the same area on the surface 25 of the target 11, to overlapping areas on the surface of the target 11, and/or to areas that are on opposite surfaces of the target 11. When beams are directed onto an overlapping area on the same surface, the optical pulses should arrive on the target substantially simultaneously so that the effective rise time of the overlapped pulses is equivalent to the rise time of the individual pulses. This requires equivalent optical paths for all beam lines, which may be accomplished by providing additional optical path length for each beam that would otherwise arrive at the target ahead of another beam.

The aluminum foil 18 blocks the path of the radiation beam 12 briefly, but is rapidly vaporized by the radiation beam 12, first in a minute region, then rapidly spreading outward from this region until the foil is vaporized over the entire area in the path of the beam. This action provides an extremely sharp leading edge in each radiation pulse 12. Thus, the switching by the foil 18 is spatially transverse. An individual area of the foil 18 switches from reflecting to transmitting in the time required for the foil vapor to expand to about three times its original volume. At the boiling point of aluminum, 2057 Celsius, the vapor expands at a velocity of about 1200 meters per second. For a typical commercially available film comprising a layer of aluminum approximately 300 angstroms thick on a Mylar supporting film about 10 micrometers thick, the irradiated aluminum triples its volume in about 48 picoseconds. Thus, the switching time at any given point within the irradiated area is about 100 times faster than the time of switching averaged over the entire area.

Figure 5:
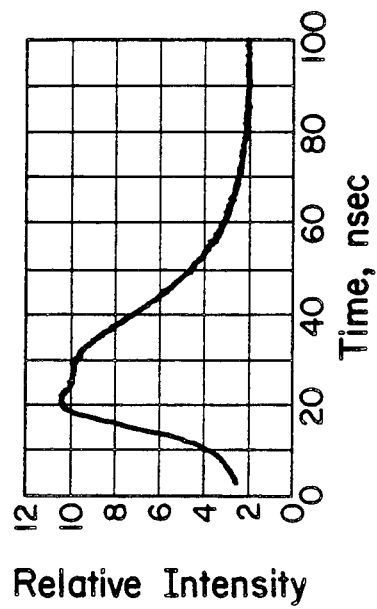
FIG. 5 is an oscilloscope trace showing the average relative intensity against time of a typical pulse of radiation for providing shock waves according to the invention.

In FIG. 5, which shows an oscilloscope trace of average relative intensity for a typical radiation pulse 12 applied to the target 11, the rise time of the pulse 12 (about 20 nanoseconds) is the time taken by the vaporized area of the aluminum film 18 to expand to the full area of the laser beam 12. The actual time for a small area of the foil to switch from reflecting to transmitting is about a factor of 100 shorter (about 0.2 nanosecond).

Relevant phenomena are described in a conference paper of the Society of Photo-optical Instrumentation Engineers of August 1976:

M. A. Duguay, M. A. Palmer, and R. E. Palmer, Laser Driven Subnanosecond Blast Shutter, Proc. SPIE, Vol. 94, High Speed Optical Techniques, pp. 2–6.

The abstract states: The opening time was measured of the so called "blast shutter", presently used as an isolator in high power laser systems. The shutter consists of a 275 angstrom thick aluminum film deposited on a transparent plastic film 12 micrometers thick. The aluminum film is suddenly removed by exposing it to high power pulses from a neodymium:glass laser ($\lambda = 1.06$ micrometers). Pulses of 50 picoseconds in duration were used that delivered between 0.5 and 3 joules per square centimeter of energy onto the aluminum film. The absorbed energy superheats the film and turns it into a rapidly expanding cloud of aluminum vapor. A blue laser beam from a continuous wave argon laser passes through the shutter and is detected by an ultrafast streak camera, set for 50 picosecond resolution. With this arrangement 10 to 90 percent shutter opening times varying from 0.8 to 4 nanoseconds have been measured, the former occurring at laser pulse energy densities of 2 joules per square centimeter.

The isolator referred to in the abstract quoted above is described in a United States Patent of 1977:

Mallozzi et al, U.S. Pat. No. 4,002,403, Jan. 11, 1977; Suppressing Superradiance.

Typically, the foil used therein comprises essentially aluminum, gold, silver, platinum, copper, or lead, about 100 to 1000 angstroms thick; typically comprising a coating on a transparent support that comprises essentially glass, quartz, polyethylene terephthalate, or other transparent plastic, and that preferably is less than about 10 wavelengths thick. These materials, and other materials appropriately adapted, may be used in the pulse sharpeners 18, 18' of the present invention.

Any metal film that allows essentially no laser light transmission through a few hundred Angstrom film thickness is usable as a pulse sharpening foil. The main advantage of using aluminum is that thin plastic film coated with a few hundred Angstroms of aluminum is readily available and is inexpensive. It is used extensively in greeting cards. In addition the surface of the aluminum is not adversely affected if oxidation occurs. The surface of copper and silver films are deleteriously affected by oxidation. The film of aluminum on plastic used in reference M, above, is the same as the film used in reference N, above, and in the examples of the present invention.

Of course the film 18 must be moved rapidly to provide a different region of the film, not already vaporized, in the path of the radiation 12 before the next pulse is generated. A typical beam 12 from the oscillator 13-17 has a diameter of about 1 centimeter, so the aluminum film 18 must be moved across the path of the beam 12 at a speed of about 50 to 100 meters per second to move the vaporized area out of the path of the beam in about 100 to 200 microseconds. However, the beam can conveniently be focussed to a diameter of about 0.3 centimeter before it impinges on the aluminum film 18, reducing the required speed to about 15 to 30 meters per second. Further concentration of the beam 12 might not be desirable, because the power flux density might then exceed the threshold above which an aluminum plasma is formed that would itself block the laser beam 12. This can be avoided by reducing the output power from the oscillator 13-17 and increasing the gain of the preamplifier 20 enough to provide the required power input level to the final amplifier 23.

Figure 4:
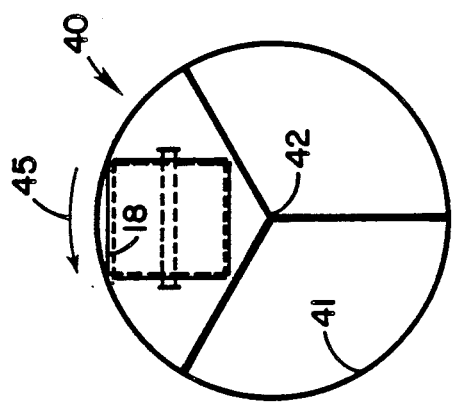
FIG. 4 is a schematic end view of typical apparatus as in FIGS. 2 and 3.
Figure 2:
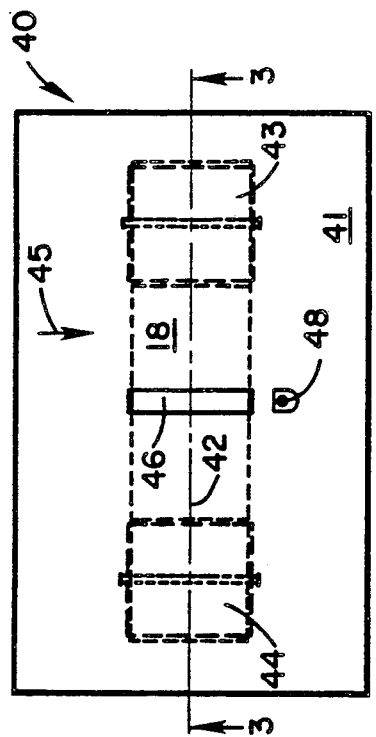
FIG. 2 is a schematic plan view of typical apparatus for providing rapid movement of a metallic film as required in some embodiments of the present invention.
Figure 3:
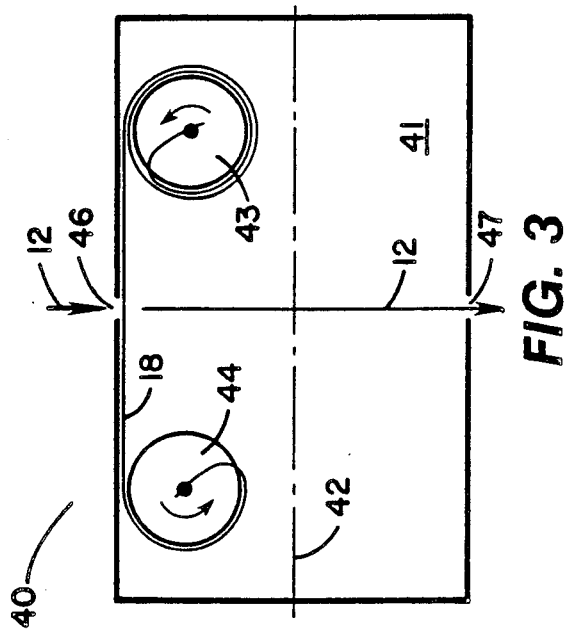
FIG. 3 is a schematic sectional view taken in the plane 3—3 of FIG. 2.

FIGS. 2, 3, and 4 illustrate schematically a suitable device for moving the film 18 at the required speed.

A cylindrical drum 41 rotates about its axis 42 at a speed high enough to provide the required rate of movement in the film 18 mounted just inside the periphery of the drum 41, between a supply spool 43 and a drive spool 44. During part of each revolution of the drum 41, as indicated by the arrow 45, the slots 46, 47 at opposite sides of the drum 41 cross the path of the radiation pulses 12; so that several pulses 12 in succession proceed in through the entry slot 46, strike the aluminum film 18, vaporizing it, and continue out from the exit slot 47 and on to the mirrors 19, etc, as shown in FIG. 1.

At the appropriate time, just before the slots 46, 47 begin to cross the path of the laser radiation 12, any suitable actuating device (not shown) is triggered by an actuating component 48 mounted on the drum 41. For example, the triggering component 48 may comprise a mirror that reflects a beam of light to a photodetector to provide a timing pulse that fires the flashlamps in the laser pump cavity 14 when the slots 46, 47 begin to cross the path of the laser beam 12. Then several laser pulses 12 in succession strike the aluminum film 18, each in a different area of the film 18, and proceed as described above in connection with FIG. 1.

The process is repeated periodically, typically about every 0.1 to 10 seconds, with the actuating device automatically turned off in the interim. Meanwhile the film 18 is advanced by the drive spool 44 to move a new region of the film 18 in line with the entry slot 46. Alternatively, the film 18 can be advanced continuously at a slower rate by the drive spool 44 to provide a different portion of the film's surface for each series of pulses 12. Typically a roll of aluminized Mylar film approximately 6 inches wide and 1000 feet long can provide the pulse sharpening for about 100,000 to 1,000,000 laser pulses 12.

Two Pulses, Slow Film Movement

Other typical embodiments of the present invention, which do not require special fast means for moving the film, also are illustrated in FIG. 1. In such embodiments the components enclosed within the dashed polygon 10' are included in the apparatus 10.

The portion of the apparatus 10 already described above provides one properly sharpened pulse in the same manner as is described above. However the pockels cell 16 is shorted only once, typically about 200 microseconds after the firing of the flash lamps in the laser pump cavity 14; so only one pulse 12 of coherent radiation of component A is provided to the target 11 within each fluorescence envelope. Also the pulse 12 proceeds from the pulse sharpener 18 through a second polarizer 15' before being directed to the preamplifier 20 by the mirrors 19.

The laser pump cavity 14, the polarizer 15, the pockels cell 16', and the output coupler 17' form a second oscillator 14-17' by means of which the other radiation component 12B provides a single sharpened pulse 12' by way of the pulse sharpener 18', the mirror 19' and the polarizer 15', which reflects the component B radiation to the first mirror 19; and from there the path of the radiation 12 is the same as that of the component 12A.

The operation of the second oscillator 13, 14, 15, 16', 17' is similar to that of the first oscillator 13-17. The second oscillator 13-17' also provides an approximately rectangular fluorescence envelope lasting about 0.1 to 5 milliseconds, and the coherent radiation 12 from the laser pump cavity 14 is linearly polarized. The polarizer 15 breaks the radiation 12 down into two linearly polarized orthogonal components; one of which (component B) it reflects, as indicated at 12B, to the pockels cell 16'. The other (component A) it transmits on, as indicated at 12A, to the pockels cell 16.

With a proper potential present across it (about 3,300 volts for a cell of transverse deuterated potassium dihydrogen phosphate), the pockels cell 16' retards the coherent radiation 12B one-fourth wavelength (90 degrees) while transmitting it on to the output coupler 17', which reflects about one-half of it back toward the polarizer 15. The reflected energy proceeds back through the pockels cell 16' with a further retardation of one-fourth wavelength (90 degrees). So the back radiation is one-half wavelength (180 degrees) out of phase with the forward radiation of component B, thus having the opposite polarization (A), and it is transmitted away through the polarizer 15, as indicated at 12C, so as not to return to the laser pump cavity 14. Thus, there can be no oscillation and laser energy builds up and is stored in the laser rod of the pump cavity 14.

At the desired predetermined instant, the potential across the pockels cell 16' is reduced to zero, typically by shorting it to ground, for about 1 to 5 microseconds. While it is shorted, the pockels cell 16' does not retard the radiation 12B, and the oscillator 13-17' produces a second laser pulse 12' in each fluorescence envelope.

Typically the pockels cell 16' is shorted about 150 microseconds later than is the pockels cell 16, so that the second radiation pulse 12 will strike the target 11 about 150 microseconds after the first pulse 12. The polarizer 15', the pockels cell 16', the output coupler 17', the pulse sharpener 18', and the mirror 19' typically are substantially identical to the correspondingly numbered items 15-19, respectively.

Thus the apparatus 10 including the components enclosed within the dashed polygon 10' provides two radiation pulses 12 to the target 11 for each fluorescent envelope.

The process is repeated periodically, typically about every 0.1 to 10 seconds. To provide a different portion of their surfaces across the path of each pulse of radiation 12, the films 18, 18' need to move only about 1 centimeter per second. Movement at such a speed can be provided easily by any suitable conventional or special means. The movement may be either continuous or intermittent.

As described above, there is no oscillation (and laser energy builds up and is stored in the laser rod of the pump cavity 14) throughout each fluorescence envelope, except while one or the other pockels cell 16 or 16' is shorted; because all of the back radiation is directed away from the pump cavity 14 by the polarizer 15, in the direction 12C. The back radiation through the pockels cell 16 is reflected by the polarizer 15 along the path 12C, and the back radiation through the pockels cell 16' is transmitted through the polarizer 15 along the path 12C.

Except during the pulses of oscillation, the radiation that passes through the output couplers 17,17' to their respective pulse sharpeners 18,18' is far too weak to vaporize the metal foil, and it remains intact.

High Efficiency

In shock treatment according to the present invention, each individual pulse of radiation must have enough energy to exceed a particular threshold so as to produce the shock waves, and the rate at which the solid material can be treated is approximately proportional to the average power of the radiation pulses. For high efficiency and optimum results, the laser and associated apparatus that provide the coherent radiation to the solid material should produce a high ratio of output energy to heat in the laser medium. This ratio depends on the extraction efficiency of the stored energy and on the fraction of energy stored at the time of Q-switching by the pockels cell. The extraction efficiency, in the region of interest, is a monotonically increasing function of the ratio of the output fluence to the saturation parameter, S.

$$S = \frac{h\nu}{\sigma_L}$$

where $h\nu$ is the laser photon energy and $\sigma_L$ is the cross section of the stimulated emission. Since the output fluence in a single pulse is limited by the damage threshold of the laser glass, the energy extraction in a single pulse is limited. For 8 Joules per square centimeter output fluence, the efficiency has been calculated to be about 40 percent for a typical phosphate glass. However, this limitation on extraction efficiency can be circumvented by providing two or more laser pulses within a single fluorescence pulse envelope.

The efficiency can be improved by making the pumping pulse width short compared to the fluorescence lifetime. However, this requires such a high power loading in the flashlamps that the resulting spectrum is too far into the ultraviolet region to pump the laser efficiently, and the lamp lifetime is greatly shortened. It is preferable to circumvent the efficiency loss due to incomplete storage of energy at the time of Q-switching by extracting more than one Q-switched pulse from a single fluorescence envelope. Typically about half of the total energy pumped into the upper laser level is stored at the time of Q-switching. The remainder of the energy is either pumped into the upper laser level after Q-switching or is lost by fluorescent decay before Q-switching. Thus, multiple pulses under a single fluorescence envelope, where the time between pulses is about 100 to 200 microseconds, can produce a substantial improvement in efficiency. Typically the efficiency of the system can be increased from about 2 percent with a single pulse to about 6 percent with a plurality of pulses.

Amplifier Materials

As mentioned above, the rate at which metallic material can be treated according to the present invention is approximately proportional to the average power of the radiation pulses that produce the shock waves, provided each individual pulse has enough energy to exceed a particular threshold. We have found that the rate of production according to the invention can be increased approximately five fold by using a recently developed type of strengthened phosphate laser glass in the amplifier 23 that delivers the radiation pulses to the target 11.

At first blush, it may seem obvious to use strengthened glass in this manner. However, strengthened laser glasses have been available for more than a decade without finding widespread use in laser systems requiring high average power. In most laser applications the brightness and coherence of the laser beam are of prime importance, and both of them degrade at high average power to the extent that the laser beam is useless for such applications even before the fracture stress is reached for ordinary unstrengthened glass. Moreover, the silicate glasses that have been available in strengthened form for many years have such high temperature coefficients of index of refraction and such high stress coefficients of index of refraction that the strengthened glasses produce no more average power than do the unstrengthened glasses. Also the coefficient of gain in silicate glass is only about two-thirds that of phosphate glass, making it unsuitable for applications requiring high power.

Heretofore, the main reason for using strengthened glass has been that it is less likely to break during shipping or other handling. The greatly increased rates of production obtainable by using a strengthened phosphate glass amplifier in shock processing according to the present invention were unexpected and far from obvious.

Ion-exchange-strengthened phosphate glass became available around 1985. It has an average power capability about five times as great as that of the older phosphate glass. The temperature coefficient of index of refraction tends to cancel the density coefficient and the resultant change in index of refraction with temperature is much lower than for silicate glasses, so it is possible to obtain higher output power, approximately proportional to the greater strength of the glass. Because of the special glass composition that is required for the strengthening, however, the efficiency of the strengthened glass is only about 75 percent of the efficiency of the equivalent unstrengthened glass. It is only because the present shock treatment does not require a radiation beam of high brightness, and because the mixed polarization resulting from stress birefringence does not have any adverse affect, that the strengthened phosphate glass can provide significant improvements in average power such as to yield much higher rates of production in the shock process of the present invention.

A laser glass that has been used to advantage in practicing the present invention is Kigre Q-89 strengthened phosphate laser glass. Q-89 is a strengthened phosphate laser glass that combines the high gain and high damage-threshold properties of the phosphate glasses with the high strength and durability characteristics of the silicate glasses. Extensive research efforts of Kigre, Inc. in conjunction with the University of Rochester have resulted in the development of a laser glass composition combined with an ion-exchange process that results in an increase in rupture strength by factors of 5 and 6 over conventional phosphate glasses. The end result is a new laser material which promises to provide a breakthrough in the capability of laser glass to provide high average power.

The manufacturer, Kigre, Inc. of Hilton Head, S.C., lists the following properties of Q-89.

| Spectroscopic Properties | |
|---|---|
| Peak Wavelength (nm) | 1054 |
| Cross Section ($\times 10^{-20}$ cm$^2$) | 3.8 |
| Fluorescent Lifetime (usec) | 350 |
| Radiative Lifetime (usec) | 308 |
| Linewidth (nm) FWH | 21.2 |
| Loss @ Lasing Wavelength (% · cm$^{-1}$) | 0.08 |
| Optical Properties | |
| Index of Refraction (Nd) | 1.559 |
| Abbe. No. | 63.6 |
| Thermal Properties | |
| Transformation Point °C. | 495 |
| Thermal Expansion ($10^{-7}$/°C.) (20°-40° C.) | 99 |
| Thermal Conductivity (W/m · K) | 0.82 |
| Physical Properties | |
| Density (gm/cc) | 3.14 |
| Solarization Resistance | Excellent |

Further information about Q-89 glass is brought out in a paper published in 1988:

K. A. Cerqua, M. J. Shoup III, D. L. Smith, S. D. Jacobs, and J. H. Kelly, Strengthened phosphate glass in a high rep rate active-mirror amplifier geometry, Applied Optics, Vol 27, No. 12, Jun. 15, 1988. pp. 2567-2572.

The abstract states: Ion-exchange strengthened phosphate glass in an active-mirror geometry remained unfractured at pump power levels 3 times the average pump fracture limit of unstrengthened phosphate glass in the same geometry. In addition, pretreatment and posttreatment measurements of surface wavefront and roughness were made on a set of rectangular substrates to quantify any ion-exchange-induced surface modifications. Experimental measurements of treatment-induced wavefront deformation of strengthened blocks were shown to be less than modeled values of distortion attributable to extended treatment times.

The solid target 11 typically comprises at least one metal, alloy, intermetallic compound, or other metallic material. Some typical target materials for which the present invention is especially useful are silver, copper, magnesium, aluminum, cadmium, zinc, iron, nickel, and titanium.

Typically a layer 26 of solid or liquid overlay material is attached to a surface 25 of the target 11, and the radiation pulse 12 is directed to the layer 26 of overlay material. The thickness of the target 11 plus any overlay 26 that is absorbent to the radiation 12 preferably is at least about two micrometers greater than the mean free path of the radiation 12 therein. The target 11 preferably is mounted against a substantially larger solid support member 31 or is rigidly held by a fixture, either of which is rigidly attached to a table or other large fixed object.

Overlays may be applied over the surface of the target 11 being treated. These overlay materials may be of two types, one transparent to the laser radiation and one opaque to the laser radiation. They may be used either alone or in combination with each other; but it is preferred that they be used in combination, with the overlay 26 directly on the surface 25 of the target 11 being opaque and the outer overlay 30 or 27 being transparent.

The layer of overlay material 26 should be attached securely over the surface 25 of the target 11 so as to be in intimate surface contact throughout the area to be radiated. Where some or all of the overlay material comprises a liquid, as at 27, it may be held within an enclosure 28, of which at least the front portion 29 preferably is transparent to the radiation 12, or it may flow over the area to be treated without restriction by an enclosure. Where a liquid transparent overlay 27 is used, the solid transparent overlay 30 may be omitted, if desired. Where only the solid transparent overlay 30 is desired, the liquid 27 and the enclosure 28 may be omitted.

Various typical and preferred kinds of overlay and target materials and combinations thereof are discussed in the first above-mentioned parent application. Also included in the specification are examples showing some of the advantages of the present invention.

Embodiments of FIGS. 6 and 11

Referring now to FIG. 6, typical apparatus according to the present invention, for improving properties of a solid material by providing shock waves therein, includes means, such as a laser oscillator 10a, for providing a plurality of pulses 112 of coherent radiation; and means 18a for sharpening the leading edge of each pulse 112.

The laser oscillator 10a comprises a rear mirror 13a, typically a 100 percent reflective spherical mirror; a Q-switch 16a, typically a pockels cell; a polarizer 15a; a laser pump cavity 14a; and an output coupler 17a.

The laser pump cavity 14a typically comprises a gain medium, such as a neodymium-glass laser rod, pumped by flashlamps that are driven at regular intervals of about 0.1 to 10 seconds by a pulse forming network (PFN). One such laser pump cavity 14a that has been used conveniently in apparatus as in FIG. 6 comprises the following components manufactured by Kigre, Inc. of Hilton Head, S.C.

FC-500/2 Laser Cavity, 8" arc length

⅜ by 7.5" Q-98 Laser rod, 3% doping level, ends 1 degree opposed, antireflection coated at both ends.

Two Fluid-cooled Flashlamps

Model 883 Controller with integral 330 watt Power Supply.

Closed Cycle Cooling System

The oscillator 10a provides an approximately rectangular fluorescence envelope lasting about 0.1 to 5 milliseconds. The coherent radiation 112 from the laser pump cavity 14a is linearly polarized. The polarizer 15a breaks the radiation 112 down into two linearly polarized orthogonal components; one of which it reflects away; and the other it transmits on between the pump cavity 14a and the pockels cell 16a.

With a proper potential present across it (about 3,300 volts for a cell of transverse deuterated potassium dihydrogen phosphate), the pockels cell 16a retards the coherent radiation 112 one-fourth wavelength (90 degrees) while transmitting it on via the pump cavity 14a to the output coupler 17a, which reflects a fraction of it (typically about 10 to 60 percent) back toward the polarizer 15a. The reflected energy proceeds back through the pockels cell 16a with a further retardation of one-fourth wavelength (90 degrees). So the back radiation is one-half wavelength (180 degrees) out of phase with the forward radiation of the transmitted component, thus having the opposite polarization, and it is reflected away by the polarizer 15a, so as not to return to the laser pump cavity 14a. Thus, laser energy builds up and is stored in the laser rod of the pump cavity 14a, because oscillations cannot occur.

After at least about 100 microseconds, the potential across the pockels cell 16a is reduced to zero, typically by shorting it to ground, for about 1 to 5 microseconds; and the shorting of the pockels cell 16a is repeated at intervals of about 100 to 200 microseconds thereafter. While it is shorted, the pockels cell 16a does not retard the radiation 112, and the oscillator 10a produces about 2 to 50 laser pulses 112 in each fluorescence envelope, with sufficient time between pulses for stored energy to build up in the laser rod, while keeping fluorescent losses to a minimum.

The output coupler 17a typically comprises a partially reflective mirror that transmits a fraction of the energy in each pulse 112 on to the pulse sharpening means 18a, and the sharpened pulse 112 proceeds to a preamplifier 20a.

The preamplifier 20a, which may be (and typically is) similar to the laser pump cavity 14a, amplifies the sharpened radiation pulse 112, typically by about 3 to 10 decibels, and the amplified radiation 112 proceeds to means for directing each pulse 112 as a beam having a predetermined diameter onto amplifying means (amplifier) 123 comprising first and second laser amplifier rods 23a,23b in series.

The means for directing each pulse 112 from the preamplifier 20a to the first laser amplifier rod 23a comprises directing, equalizing, and beam expanding means including a mirror 129, a retarder plate 130 (typically a half-wave plate), a negative lens 131, a positive lens 132, and a mirror 133. The retarder plate 130 typically is rotated to adjust the fractions of the energy delivered by the beam splitter 137 to the second and third laser amplifier rods 23b and 23'a so as to equalize the energy delivered by the amplifier chains 123 and 123'. The beam expander comprises the negative lens 131 followed by the positive lens 132, to expand the diameter of the beam by a factor of about 2.5, from about 1 centimeter (the diameter of the preamplifier rod 20a) to about 2.5 centimeters (the diameter of the amplifier rod 23a).

The amplifier 123 includes means, typically including a beam splitter 137, for directing at least a major portion of the radiation 112 amplified by the first amplifier rod 23a to the second amplifier rod 23b.

The apparatus further includes means for directing the radiation 112 amplified by the second amplifier rod 23b to a surface of the solid material; and means for providing substantially uniform spatial amplitude in the radiation 112 directed to the surface of the solid material.

The first laser amplifier rod 23a typically further amplifies the radiation pulse 112 from the preamplifier 20a by about 5 to 15 decibels. One amplifier 23a that has been used conveniently in the apparatus comprises the following components manufactured by Kigre, Inc. of Hilton Head, S.C.

Power Amplifier Assembly, FA-1000/2

27 mm dia. × 810 mm long Q-89 Laser Rod (described hereinafter)

Two Fluid-cooled Lamps, 63 cm arc length

Model 886-2 Power Supply compatible with 883 Controller

Dual PFN assemblies

Coolant-to-water Cooling System

Referring now to FIG. 1 for typical means for directing the radiation 112 to a surface of the solid material; the amplified radiation pulse 112 typically may be focussed by a positive lens 24 onto a desired area of the surface 25 of the target 11, to provide an average energy fluence therein typically of at least about 10 (and preferably about 10 to 500) Joules per square centimeter, and an average power flux on the target of at least about $10^7$ (and preferably about $10^9$ to $10^{11}$) watts per square centimeter, with pulse lengths typically of about 10 to 1,000 nanoseconds. The maximum power flux will be limited by the formation of a reflecting plasma at the target surface. This maximum power flux will increase as the laser wavelength decreases. For example for a laser wavelength of 0.53 micrometer the maximum power flux will be approximately four times that for a wavelength of 1.06 micrometers.

A portion of the output 112 of the first amplifier rod 23a, typically about 10 percent, may be directed by the beam splitter 137 and mirrors 139 to a second similar amplifier 123' to provide a second amplified radiation pulse 112', focused by a positive lens onto a desired area of the surface 25 of the target 11 simultaneously with the pulse 112 from the amplifier 123. In the same way, a portion of the output 112' from the amplifier 23'a may be directed by a beam splitter 37' etc, and any convenient number of amplifiers may be employed similarly to provide additional pulses to the target 11.

Typically pulses from the different amplifiers are directed to the same area on the surface 25 of the target 11, to overlapping areas on the surface of the target 11, and/or to areas that are on opposite surfaces of the target 11. When beams are directed onto an overlapping area on the same surface, the optical pulses should arrive on the target substantially simultaneously so that the effective rise time of the overlapped pulses is equivalent to the rise time of the individual pulses. This requires equivalent optical paths for all beam lines, which may be accomplished by providing additional optical path length for each beam that would otherwise arrive at the target ahead of another beam.

Uniform Spatial Amplitude

In typical preferred embodiments of the invention the means for providing substantially uniform spatial amplitude in the radiation 112 comprises the amplifying means 123. In such embodiments, as illustrated in FIG. 7, the amplifying means 123 typically includes with each laser amplifier rod 23a,23b a pair of flashlamps 70,71 for pumping the rod 23a, the axis of each flashlamp 70,71 and the axis of the rod 23a being substantially parallel to each other and substantially in the same plane; and the plane containing the axis of the second laser amplifier rod 23b and the axes of its associated flashlamps 70,71 is substantially perpendicular to the plane containing the axis of the first laser amplifier rod 23a and the axes of its associated flashlamps 70,71.

Figure 7:
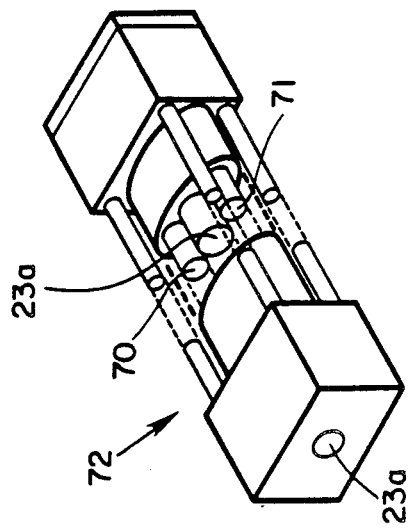
FIG. 7 is an isometric view, with a middle portion cut away to show a cross-section, of a typical preamplifier in apparatus as in FIG. 6.

For example, as shown in FIG. 7, the axes of the first amplifier rod 23a and the flashlamps 70,71 typically may lie in the same horizontal plane. Then the axis of the second amplifier rod 23b typically extends in nearly (but not quite) the same direction (at least optically) and in the same horizontal plane as the axis of the first amplifier rod 23a. The supporting structure 72, however, is rotated by substantially 90 degrees about the axis of the amplifier rod 23b so that it and the axes of the flashlamps 70,71 (although still pointing in the same horizontal direction) define a substantially vertical plane. Of course the arrangements may be reversed; or other equivalent arrangements may be substituted.

The apparatus typically comprises also means 137, 143–148 for directing a minor portion of the radiation 112 amplified by the first amplifier rod 23a to second amplifying means 123' (which may be, and typically is, similar to the amplifying means 123) comprising third and fourth laser amplifier rods 23'a,23'b in series. The beam splitter 137 directs a selected fraction of the beam 112 from the first amplifier rod 23a via a positive lens 143, mirrors 144,145, a negative lens 146, and a mirror 147, through an iris 148 to the third amplifier rod 23'a.

The apparatus further typically includes means for directing at least a major portion of the radiation 112' amplified by the third amplifier rod 23'a, through an iris 149, to the fourth amplifier rod 23'b; and means (typically comprising components such as those described above and shown in FIG. 1.) for directing the radiation 112' amplified by the fourth amplifier rod 23'b to a surface of the solid material 11; and so on similarly for any desired number of additional similar amplifying means.

Typically each means for directing radiation 112,112' to a surface of the solid material 11 provides the radiation to the surface at an intensity of about 10 to 500 Joules per square centimeter. Also each means for directing radiation to a surface of the solid material directs its portion of the radiation substantially simultaneously to an area on the same surface that overlaps at least a portion of the area to which another said means directs its portion of the radiation. Typically the optical path length of each beam is selected so as to provide the substantially simultaneous arrival at the surface by each portion of the radiation. Optimally each means for directing radiation to the same surface of the solid material directs its portion of the radiation to an area on the surface such that all of said means together direct the total radiation approximately evenly over a continuous area at least about one-third as large as the area that the radiation would cover if directed entirely to areas of the surface that do not overlap. In other words, the overlapping of each beam with a second beam is at least substantially complete over the area, and with as little further overlapping as is conveniently possible with a third beam.

Alternatively at least one of the means for directing radiation to a surface of the solid material may direct its portion of the radiation substantially simultaneously to an area on a different surface of the solid material from the surface to which at least one other said means directs its portion of the radiation; and said means typically direct their respective portions of the radiation to areas that are substantially opposite to each other and on opposite sides of the solid material.

In typical embodiments of the invention, the means for providing substantially uniform spatial amplitude in the radiation comprises the amplifying means 123,123';

each amplifying means includes with each laser amplifier rod 23a,23b; 23'a,23'b a pair of flashlamps 70,71 for pumping the rod, the axis of each flashlamp and the axis of the rod being substantially parallel to each other and substantially in the same plane (in FIG. 7, the horizontal plane);

the plane containing the axis of the second laser amplifier rod 23b and the axes of its associated flashlamps 70,71 is substantially perpendicular to the plane containing the axis of the first laser amplifier rod 23a and the axes of its associated flashlamps 70,71;

the plane containing the axis of the fourth laser amplifier rod 23'b and the axes of its associated flashlamps 70,71 is substantially perpendicular to the plane containing the axis of the third laser amplifier rod 23'a and the axes of its associated flashlamps 70,71;

and so on similarly for any additional similar amplifying means.

Typically the pulse providing means comprises a laser oscillator 10a,10"a including a rod and a pair of flashlamps for pumping it, the axis of each flashlamp and the axis of the rod 10a,10"a being substantially parallel to each other and substantially in the same plane; and a preamplifier 20a including a rod and a pair of flashlamps for pumping it, the axis of each flashlamp and the axis of the rod being substantially parallel to each other and substantially in the same plane;

the means for providing substantially uniform spatial amplitude in the radiation comprises the laser oscillator 10,10"a and the preamplifier 20a; and the plane containing the axis of the preamplifier rod and the axes of its associated flashlamps is substantially perpendicular to the plane containing the axis of the oscillator rod and the axes of its associated flashlamps.

In some typical embodiments of the invention, the means for providing substantially uniform spatial amplitude in the radiation comprises the pulse providing means 10c, and the pulse providing means comprises means for providing a beam of coherent radiation 12" that is not polarized and in which each succeeding pulse is, in the spatial amplitude pattern of the beam, substantially a mirror image of the pattern in the pulse that preceded it.

Figure 12:
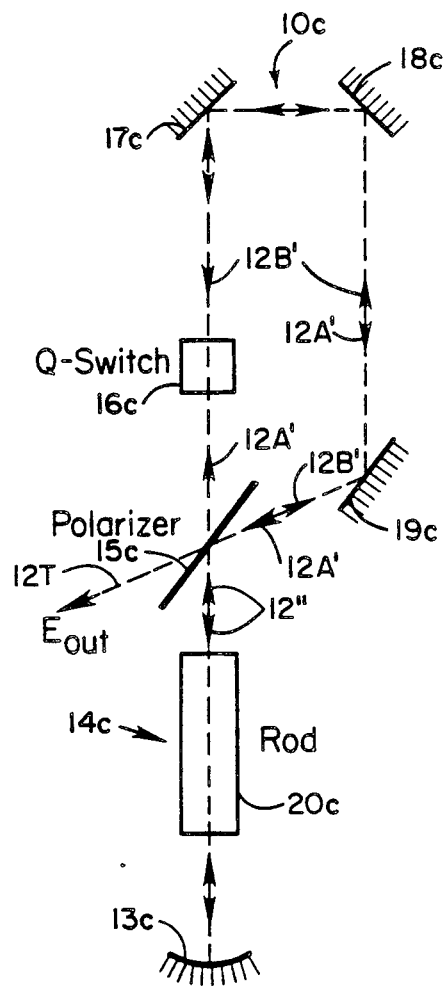
FIG. 12 is a schematic plan view illustrating typical unpolarized laser oscillators according to the present invention.

In such embodiments, the means for providing a beam of coherent radiation typically comprises a. laser means 14c for providing a beam of unpolarized coherent radiation 12" in a predetermined first direction (upward in FIG. 12);

b. polarizing means 15c located in the path of the beam 12", for breaking down the radiation 12" into two linearly polarized orthogonal components 12A',12B', transmitting one component 12A' through it in the first (upward) direction, and reflecting the other component 12B' from it in a predetermined second direction; (upper rights in FIG. 12);

c. means 17,18,19 for reflecting the component 12A' that was transmitted through the polarizing means 15c, along a first closed path 15c,17c,18c,19c,15c (clockwise in FIG. 12) that ends in directing it back to the polarizing means 15c in a predetermined third direction (lower left in FIG. 12), opposite to the second direction, and for reflecting the component 12B' that was reflected from the polarizing means 15c, along a second closed path 15c,19c,18c,17c,15c (counterclockwise in FIG. 12) that is opposite to the first closed path 15c,17c,18c,19c,15c, and ends in directing it back to the polarizing means 15c in a predetermined fourth direction (downward in FIG. 12), opposite to the first direction;

d. means 16c located in the closed paths 15c,19c,18c,17c,15c; 15c,17c,18c,19c,15c for retarding each component 12A',12B' of the radiation by a predetermined fraction of a wavelength (typically about 0.1 to 0.25 wavelength), so that a substantial fraction (typically about 10 to 50 percent) of the transmitted component 12A' is transformed into the opposite component 12B' before reaching the polarizing means 15c, and so that a substantial fraction (typically the same range as above) of the reflected component 12B' is transformed into the opposite component 12A' before again reaching the polarizing means 15c;

e. so that the transformed transmitted component (now 12B') is reflected from the polarizing means 15c in the fourth (downward) direction to the laser means 14c to maintain oscillation therein, and the transformed reflected component (now 12A') is transmitted through the polarizing means 15c in the fourth (downward) direction to the laser means 14c to maintain oscillation therein; and f. so that the fraction of the transmitted component 12A' that remains not transformed is transmitted through the polarizing means 15c in the third direction (lower left), and the fraction of the reflected component 12B' that remains not transformed is reflected from the polarizing means 15c in the third direction (lower left); and thus g. so that the two last mentioned components 12A',12B' combine to form a beam 12T of unpolarized useful output radiation $E_{out}$ that is directed in the third direction (lower left).

In other, somewhat similar, typical embodiments, wherein the means for providing substantially uniform spatial amplitude in the radiation comprises the pulse providing means, the pulse providing means typically comprises means for providing a beam of coherent radiation that is not polarized and in which each succeeding pulse is, in the spatial amplitude pattern of the beam, rotated about its axis by a predetermined angle from the pattern in the pulse that preceded it.

Figure 14:
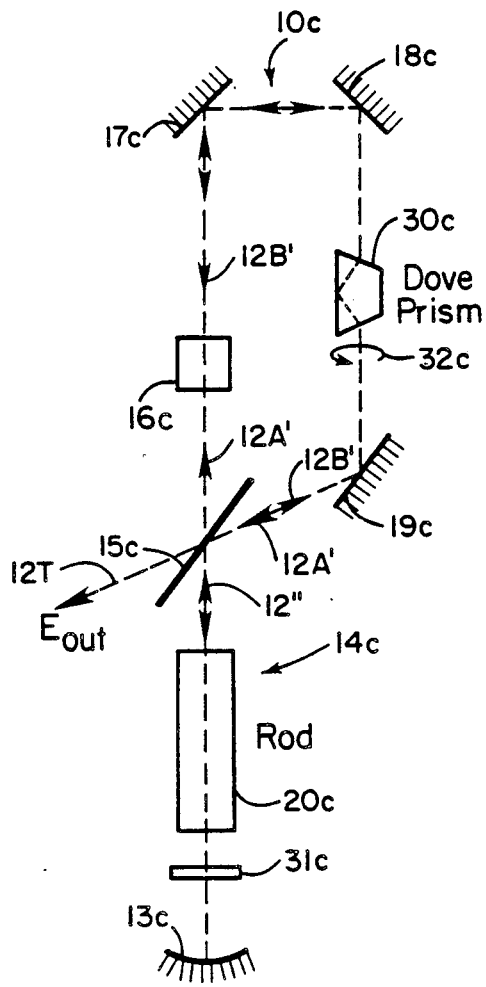
FIG. 14 is a schematic plan view illustrating typical embodiments of oscillators that are generally similar to those of FIG. 12 and include additional devices to provide another advantageous characteristic.
Figure 15:
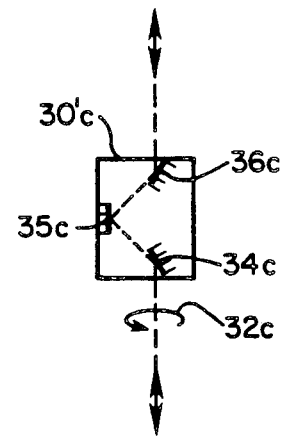
FIG. 15 is a schematic view of an alternative device for one of the devices in FIG. 14.

Such embodiments typically comprise, in addition to the means a-g described above, h. means (typically either a dove prism 30c (as in FIG. 14) or an optionally equivalent arrangement 30'c of mirrors 34c,35c,36c) as in FIG. 15) located in the closed paths 15c,17c,18c,19c,15c; 15c,19c,18c,17c,15c for rotating the beam of radiation 12" about its axis (typically at least about 5 degrees);

i. means 31c (typically a (preferably quarter wave) retardation plate) in the laser means 14c for retarding the radiation beam 12" from each pass through the closed paths to the next pass therethrough by a predetermined fraction of a wavelength (typically by about $\frac{1}{8}$ to $\frac{3}{8}$, and preferably about $\frac{1}{4}$, wavelength) per one-way pass through the retarding means in each direction; i.e. about $\frac{1}{4}$ to $\frac{3}{4}$ (and preferably about $\frac{1}{2}$) wavelength total retardation per two-way pass through the retarding means); and thus j. so that the radiation beam 12" is rotated from each pass through the closed paths to the next pass therethrough by a predetermined angle (typically at least about 5 degrees).

Pulse Sharpening

In typical apparatus according to the invention, the means for sharpening the leading edge of each pulse comprises means for providing phase conjugation reflection of the radiation to limit the rise time of the pulse to not longer than about 5 nanoseconds. Such means typically comprises a stimulated Brillouin scattering (SBS) cell wherein the reflecting material comprises a liquid or a gas. Typically the reflecting material comprises carbon tetrachloride, sulfur hexafluoride, methane, acetone, benzene, carbon disulfide, or ethylene glycol.

The following articles describe the use of stimulated Brillouin scattering for Q-switching of lasers, including conditions for stable operation. The first two articles include profiles of pulses (somewhat similar to FIG. 5 herein) showing sharpening that provides rise times short enough to be useful in carrying out the present invention.

H. Meng, V. Aboites, H. J. Eichler, SBS Q-switched Nd: YAG laser, Revista Mexicana de Fisica 38 No. 3 (1990) pp. 335-339.

S. B Kormer, G. G. Kochemasov, S. M. Kulikov, Val. D. Nikolaev, Vik. D. Nikolaev, and S. A. Sukharev, Use of stimulated Mandelstam-Brillouin scattering for peaking pulses and interstage decoupling in laser fusion experiments, Sov. Phys. Tech. Phys. 25(6), June 1980 pp. 757-758.

V. I. Bezrodnyi, F. I. Ibragimov, V. I. Kislenko, R. A. Petrenko, V. L. Strizhevskii, and E. A. Tikhonov, Mechanism of laser Q switching by intracavity stimulated scattering, Sov. J. Quantum Electron 10(3) March 1980 pp. 382-383.

The stimulated Brillouin scattering cell 18e may be located in the oscillator cavity 10a", as in FIG. 11; or it may be located external to the oscillator cavity 10a, as in FIG. 6. (FIG. 11 comprises an alternative embodiment for the combination of the oscillator 10a, the pulse sharpener 18a, the preamplifier 20a, and the directing mirror 129 in FIG. 6 (everything in the left portion of FIG. 6 from the back mirror 13a to the point 129a).)

The means for providing phase conjugation reflection by photoacoustic scattering may comprise also means for providing Faraday rotation of the radiation. Such means typically comprises a Faraday isolator 18b and a stimulated Brillouin scattering cell 18d.

Brillouin scattering is the nonlinear optical phenomenon of the spontaneous scattering of light in a medium by its interaction with sound waves passing through the medium. The scattering takes place on an atomic level. Faraday rotation is the effect, discovered by Faraday in 1845, whereby optically inactive materials or substances become capable of rotating the polarization plane of polarized radiation (light) passed through them when they are placed into a strong magnetic field that has a component in the direction of rotation. A familiar optical instrument utilizing this effect is the Faraday rotator, and a well-known present day application is in the protective devices used to prevent the destruction of high power laser systems by back reflections from the target or other "downstream" system points.

In typical embodiments of the invention, the diameter of each laser amplifier rod 23a,23b; 23'a,23'b is about 2 to 3 centimeters. The output fluence level in each amplifier rod 23a,23b; 23'a,23'b typically is about 6 to 20 Joules per square centimeter.

The components in the amplifier means 123,123' affecting flashlamp efficiency, cavity transfer efficiency, quantum defect, quantum efficiency, and extraction efficiency preferably are selected to provide substantially maximum overall efficiency therein. Typically cerium is provided in the walls of the flashlamps 70,71 to minimize the number of photons emitting with wavelengths substantially shorter than 0.85 micrometer, and krypton is provided in the flashlamps 70,71 to minimize the number of photons emitting with wavelengths longer than about 0.85 micrometer, to confine the radiation from the flashlamps 70,71 predominantly to a narrow range of wavelengths just less than about 0.85 micrometer.

Typically the amplifier rods 23a 23b; 23'a,23b comprise a material having an absorption cross-section of less than about $10^{-3}$ per centimeter and a stimulated emission cross-section of greater than about $4 \times 10^{-20}$ square centimeters. Such rods typically comprise neodymium-doped glass, wherein the concentration of neodymium is about 1.5 to 2.5 percent by weight.

A pulse with a fast rise time is essential for shock processing. Peak pressures are approximately proportional to $P_M\tau$ where $P_M$ is the peak power and $\tau$ is the rise time. While a short pulse with high peak power would meet the peak pressure requirements, the total energy in the pulse must be high to achieve the necessary depth of shock wave penetration in the material. This leads to the need for an asymmetric pulse for efficient shock processing. The leading edge must be sharpened. This can be done in a number of ways. Thin films, Pockels cells, fast nonlinear dyes, and stimulated Brillouin mirrors have been considered. Aluminum films and stimulated Brillouin scattering cells have been the most effective for us so far. New developments in technology may lead to a preference later on for one of the other sharpening means.

Amplifier Efficiency

In the apparatus of FIG. 6, the oscillator and preamplifier are fairly standard, but the amplifiers have been designed to optimize performance in this application. Shock processing places greatest importance on high-average power and pulse energy capabilities of the amplifiers. Beam brightness or divergence is important in most other laser applications; but for shock processing, divergence affects only the details of the relay optics.

A pulse energy of at least about 50 Joules is considered necessary to meet minimum target spot size and fluence requirements. The amplifiers are designed largely around these requirements. Safe operation of the best platinum-free laser glasses limits the fluence to about 10 Joules per square centimeter, requiring at least about 5 square centimeters of beam area. The optimum rod diameter for this application is about 2 to 3 centimeters. Because maximum pump rate depends only on pump length, larger diameter stages do not produce higher average power.

Amplifier efficiency is a product of five separate efficiency terms: flashlamp efficiency, cavity transfer efficiency, quantum defect, quantum efficiency, and extraction efficiency.

Flashlamp efficiency is the fraction of electrical energy radiated by the lamps. Since the energy loss is in the lamp walls and electrodes only, this efficiency does not affect the maximum average power of the rod. So lamp efficiency may be sacrificed to improve the quantum defect.

Cavity transfer efficiency relates to the transfer of energy from lamps to rod, and has no direct effect on average power limits. However, there are major indirect effects. Unless the absorption is kept low in the reflector in the pump cavity, the reflector's contribution to rod pumping is not high enough to maintain uniform pumping, and the average laser fluence falls far below the 10 Joules per square centimeter needed for spatial uniformity. So the amount of energy per pulse is less than the desired 50 Joules. Also, the flashlamps would have to be pumped beyond their best wall loading.

This would shift the emitted spectrum toward the ultraviolet and thus would reduce the quantum defect (the efficiency for converting photon energy absorbed in the gain medium to available stored energy).

Figure 8:
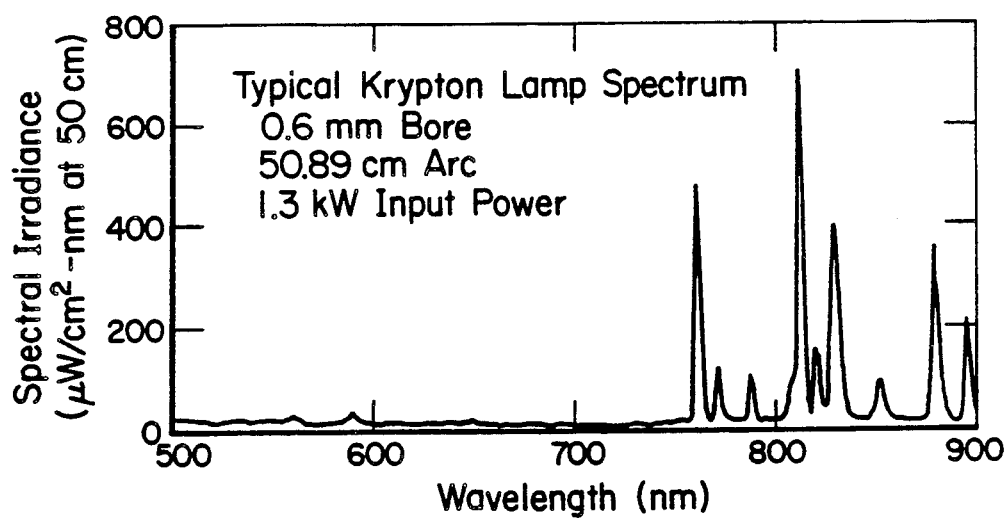
FIG. 8 is a graph of spectral irradiance against wavelength for typical krypton flashlamps suitable for use in apparatus as in FIG. 6.
Figure 9:
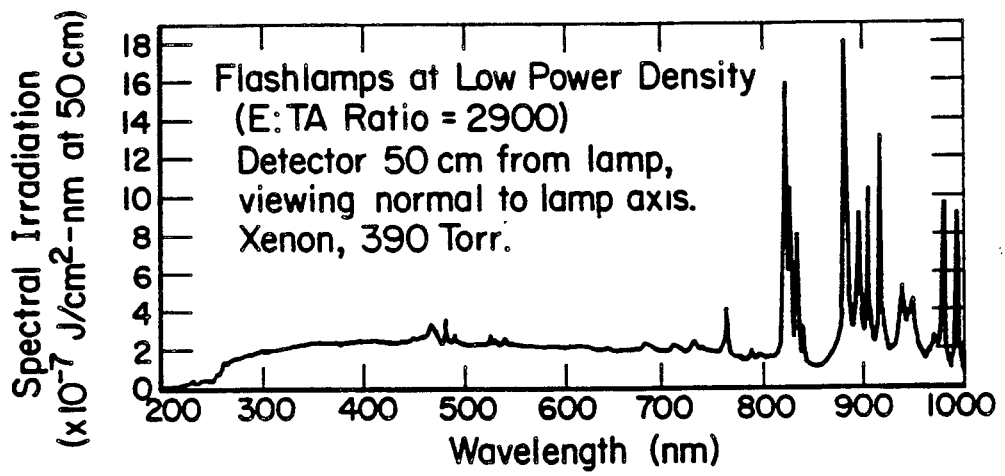
FIG. 9 is a graph of spectral irradiance against wavelength for typical xenon flashlamps suitable for use in apparatus as in FIG. 6.

An absorbed photon with a wavelength of 0.85 micrometer has a quantum defect of 0.78. Only the energy lost in the transition from the lower laser level to the ground state is lost. Absorbed photons with wavelengths longer than 0.85 micrometer do not contribute to stored energy, as they have a quantum defect of zero. Absorbed photons with wavelength λ shorter than 0.85 micrometer have a quantum defect equal to $0.78\lambda/0.85$, where λ is in micrometers. To minimize heating in the rod, it is important to minimize the number of ultraviolet photons and photons with wavelengths longer than 0.85 micrometer. Ultraviolet radiation is filtered out of the flashlamp spectrum by adding cerium to the lamp walls. Longer wavelength emissions are minimized by substituting krypton filling gas for the more efficient xenon (FIGS. 8 and 9).

Quantum efficiency is the fraction of transitions from the upper laser level going to the ground state via the lower laser level. The quantum efficiency is affected by composition and impurities in the laser glass. (This is not generally known.) Battelle set up a special interferometer to measure heat simultaneously with available stored energy. Kigre Q-88 and Schott LG760 were the best of those tested with $\chi=1.55$, where $\chi$ is the ratio of heat to available stored energy.

Finally, extraction efficiency increases with output fluence, although the efficiency nearly levels off for output fluence levels greater than 10 Joules per square centimeter. This was one of the reasons for choosing 10 Joules per square centimeter as the design output. Low absorption cross-section, $\alpha$ at the laser wavelength, 1.05 micrometers, and high stimulated emission cross-section, $\alpha$, are also needed for high extraction efficiency. The gain, G, is related to these cross-sections by the equation $$G = exp\,(\sigma N_1 - \alpha)\,L$$

where $N_1$ is the number of atoms in the upper laser level, and L is the length of the gain medium. For this application a laser glass was chosen with $\alpha < 10^{-3}$ per centimeter and $\alpha < 4 \times 10^{-20}$ square centimeters.

Efficient use of the energy deposited in the gain medium is only one of the two requirements for high average power. The other is the choice of laser glass with optimum physical properties, high strength, high thermal conductivity, and low expansion coefficient. Glasses strengthened by ion exchange on the surface have been shown to increase the fracture power threshold by as much as a factor of 6.

Figure 10:
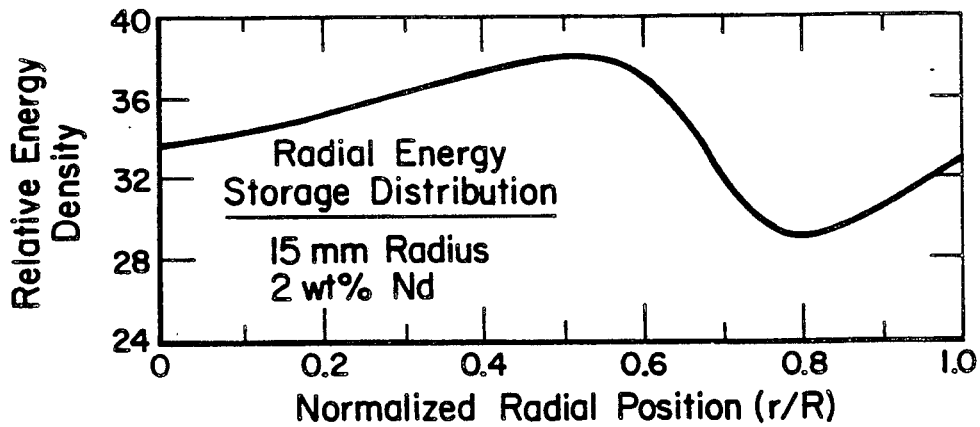
FIG. 10 is a graph of relative energy density against normalized radial position for typical useful conditions in apparatus as in FIG. 6.

Because the total energy per pulse is limited by the peak energy density on the output face of the amplifier rod, spatial uniformity is essential. Energy is pumped into the rod through the cylindrical surface and attenuates as it penetrates toward the center. Without any focusing of the pump radiation, the absorbed energy would be at a maximum at the cylindrical surface and a minimum at the center. However, the rod acts as a cylindrical lens increasing the intensity at the center. By choosing the optimum neodymium concentration, these two effects can be nearly balanced, producing a fairly flat distribution. The results of our calculations, shown graphically in FIG. 10, indicate that 2 percent neodymium. by weight, provides good radial flattening.

There is also an appreciable circumferential nonuniformity, due to the placement of the two flashlamps. This distortion has been minimized by rotating the second amplifier in the chain by 90 degrees. Rotating one amplifier with respect to the other is better than putting four lamps in each head; because it costs less, gives greater spacing between lamps (which protects against electrical breakdown), and requires less reflector area (producing less reflector absorption loss).

An alternative approach to solving the circumferential lamp pumping is to use helical flashlamps, which surround the rod equally around the circumference of the rod. However, this approach is somewhat more expensive in both flashlamp and power supply cost.

Unpolarized Laser Oscillators

Useful alternatives to the oscillator 13-17 or 10a in apparatus as in FIG. 1 or FIG. 6 are shown in FIGS. 12-15. These oscillators provide coherent radiation that is not polarized.

The Q-switch (pockels cell) time sequence operation of the oscillator shown in FIG. 12 is the following:

At time $t_0$ the flashlamps are fired. There is no voltage on the pockels cell at $t_0$. The transmitted polarization travels around the ring in the clockwise direction and is transmitted out when it strikes the polarizer again. The reflected polarization travels around the ring in the counterclockwise direction and is reflected out when it strikes the polarizer again. The cavity is open with no voltage on the pockels cell, and energy is stored in the rod. At time $t_1$, voltage is applied to the pockels cell. When quarter wave voltage is applied, half of the beam is transmitted and half is reflected. This is equivalent to a fifty percent output coupler. Lower voltage lowers the effective reflectivity and higher voltage increases it.

Since the beam is unpolarized going through the rod, there is no stress birefringence loss to cause nonuniformity in the beam. Likewise the cavity can have no unwanted losses due to reflections from the polarizer. This configuration has several advantages:

A. The pockels cell can be operated at the lowest voltage consistent with the desired output, minimizing the recirculating energy in the cavity, and improving the lifetimes of the polarizer and the pockels cell.

Figure 13:
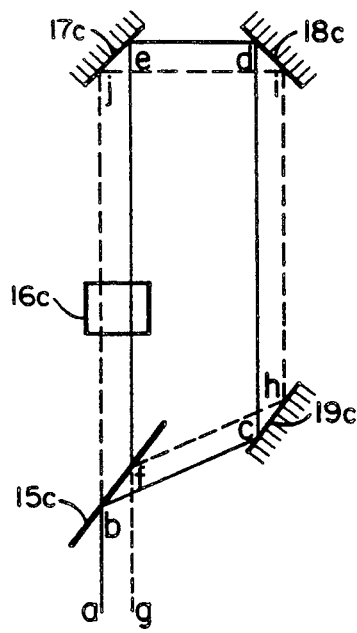
FIG. 13 is a similar view of part of the oscillators as in FIG. 12, illustrating an advantageous characteristic thereof.

B. In addition to the improvement in uniformity arising from the elimination of the Maltese cross, the beam pattern flips top to bottom, or side to side, with each pass, as shown in FIG. 13.

C. No output couplers are needed. A conventional system requires a large array of output couplers.

D. This configuration can operate in the cavity dump mode without modification if the pockels cell is operated at half wave voltage for a buildup time of typically several photon transit times.

The sequence of operation in more detail is the following:

At time $t_0$, the flashlamps (not shown) in the laser pump cavity 14c are fired with no voltage on the pockels cell 16c. The transmitted polarization 12A' travels around the ring of mirrors in the clockwise direction 17c,18c,19c, and is transmitted out at the polarizer 15c, as indicated at 12T. So the cavity is open for the transmitted polarization 12A', and cannot lase. In a similar manner, the reflected polarization 12B' travels around the ring of mirrors in the counterclockwise direction 19c,18c,17c, and it is reflected out at the polarizer 15c, as indicated at 12T. So the cavity is also open for this polarization 12B', and cannot lase.

At time $t_1$, after the flashlamps have been on for typically several hundred (e.g. about 100 to 500) microseconds, the pockels cell 16c receives a voltage of typically about 1 to 4 kilovolts, causing about a tenthwave to a quarterwave retardation in the path of each polarization of radiation described above. So the 12A' polarized radiation passing upward through the pockels cell 16c is transformed into the 12B' polarization, and is reflected by the mirrors 17c,18c,19c in the clockwise direction to the polarizer 15c from which it is reflected back to the rear mirror 13c. Meanwhile the 12B' polarized radiation passing downward through the pockels cell 16c is transformed into the 12A' polarization and is transmitted through the polarizer 15c back to the rear mirror 13c. This closes the cavity for both polarizations when the stored energy in the gain medium (the rod 20c) has built up to the desired level. The rear mirror of the cavity is the concave mirror 13c, and the polarizer 15c is the effective output coupler.

The fraction of energy coupled out at each pass is determined by the voltage on the pockels cell 16c. For a KD*P (deuterated potassium dihydrogen phosphate) cell, half of the energy is coupled out at about 3.3 kilovolts, and none of the energy couples out at about 6.6 kilovolts. (Conventionally Q-switched oscillators operate with about 20 to 50 percent of the energy removed by the output coupler.) The voltage remains on the pockels cell typically for a few (e.g. about 0.1 to 10) microseconds.

The contrast ratio of a typical dielectric polarizer is much better for the transmitted beam than for the reflected beam. The poor contrast ratio of the reflected beam allows energy to leak out of the oscillator during the charging period. This problem can be corrected by using two dielectric polarizers, with their polarizer surfaces adjacent, typically about 0.1 to 1 millimeter apart. The other surfaces must be antireflection coated, because the usual Brewster angle geometry to prevent loss of the desired polarization is not effective in a cavity with both polarizations.

The coherent radiation 12" is generated by an oscillator 10c (all of FIG. 12) comprising a rear mirror 13c, a laser pump cavity 14c, a polarizer 15c, a pockels cell 16c, and three mirrors 17c,18c,19c. The laser pump cavity 14c comprises a gain medium, such as at least one neodymium-glass laser rod 20c pumped by flashlamps (not shown), that are driven by a pulse forming network (PFN) (not shown). One such laser pump cavity 14c that has been used conveniently in the oscillator 10c comprises the following components manufactured by Compagnie Generale Electrique, of France CGE-640 laser cavity, 67 centimeters long, helical flashlamps 64 millimeters × 670 millimeters laser rod with 1 percent Nd doping. Antireflection coated at both ends.

8 Helical flashlamps

For simplicity, FIGS. 12 and 13 show only one laser rod 20c. We typically use two of the rods described above, and any convenient number may be employed. The rear mirror 13c typically may be either planar or spherical. A spherical mirror with 100 percent reflectivity and a 20 meter radius of curvature is convenient in combination with the above equipment.

The oscillator 10c provides a fluorescence envelope. The coherent radiation 12" from the laser pump cavity 14c is unpolarized. The polarizer 15c breaks the radiation 12" down into two linearly polarized orthogonal components 12A',12B'; one of which (component A') it transmits in the clockwise direction, as indicated at 12A'; and the other (component B') it reflects to the right in the counterclockwise direction, as indicated at 12B'; to the pockels cell 16c.

With a proper potential present across it (about 1 to 4 kilovolts for a cell of transverse deuterated potassium dihydrogen phosphate), the pockels cell 16c retards the coherent radiation component 12A' while transmitting it on in the clockwise direction to the mirrors 17c,18c,19c, and thence to the polarizer 15c, which reflects a fraction of it back through the rod 20c, to the rear mirror 13c and transmits the remainder 12T to the target, as indicated at $E_{out}$. The reflected radiation component 12B' proceeds back in the counterclockwise direction by way of the mirrors 19c,18c,17c and thence through the pockels cell 16c, with a retardation, to the polarizer 15c, which transmits a fraction of it back through the rod 20c to the rear mirror 13c and reflects the remainder 12T to the target, as indicated at $E_{out}$.

When the flashlamps are originally fired, no voltage is on the pockels cell 16c. Neither the clockwise 12A' nor the counterclockwise 12B' radiation component can return to the rear mirror 13c, because all of the energy exits the cavity; being either transmitted (12A') or reflected (12B'), by the polarizer 15c, away from the rod 20c, as indicated at 12T and $E_{out}$. During this time, energy builds up on the rod 20c. After about 100 to 500 microseconds, voltage is applied to the pockels cell 16c to initiate the laser pulse. Voltage is removed from the pockels cell 16c after about 0.1 to 10 microseconds.

The uniformity of the output beam from an oscillator as in FIG. 12, which we have dubbed the "P-Oscillator" because of its P-shaped arrangement apparent from FIGS. 12 and 14, is achieved largely because of the fact that the output 12T comprises the combination of both components 12A',12B' of the radiation 12" from the laser pump cavity 14c, as explained above. Moreover, the uniformity is enhanced by virtue of a feature inherent in the invention that is illustrated in FIG. 13; namely the pattern of the beam in each pass is flip-flopped left and right (as viewed in FIGS. 12 and 13) from the pattern of the preceding pass, as is explained below.

In the first pass of the beam 12", the component 12B' at the left side of the beam 12", shown as a solid line following the counterclockwise inner path abcdef, is transformed between e and f (by the pockels cell 16c) to the component 12A', and is transmitted down through the polarizer 15c from f to g.

This 12A' component (on the right side of the beam 12") is reflected back up from the rear mirror 13c (This is the second pass.) from g to f where it is transmitted up through the polarizer 15c. Then it is transformed by the pockels cell 16c into the component 12B', which proceeds along the clockwise inner path edcb (solid line) and is reflected down by the polarizer 15c from b to a and thence to the rear mirror 13c.

In the next (third) pass, this 12B' component (now again on the left side) is reflected back along the path abcdefg in the same manner as described above for the component 12B' at the left side of the beam 12" in the first pass.

Similarly, the description for the fourth pass is the same as the description above for the second pass, the description for the fifth pass is the same as that for the third pass, and so on for the subsequent passes.

In the first pass of the beam 12", the component 12B' at the right side of the beam 12", shown as a dashed line following the counterclockwise outer path gfhijb, is transformed between j and b (by the pockels cell 16c) to the component 12A', and is transmitted down through the polarizer 15c from b to a.

This 12A' component (on the left side of the beam 12") is reflected back from the rear mirror 13c (This is the second pass.) from a to b where it is transmitted up through the polarizer 15c. Then it is transformed by the pockels cell 16c into the component 12B', which proceeds along the clockwise outer path jihf (dashed line) and is reflected down by the polarizer 15c from f to g and thence to the rear mirror 13.

In the next (third) pass, this 12B' component (now again on the right side) is reflected back along the path gfhijb in the same manner as described above for the component 12B' at the right side of the beam 12" in the first pass.

Similarly, the description for the fourth pass is the same as the description above for the second pass, the description for the fifth pass is the same as that for the third pass, and so on for the subsequent passes.

The descriptions for the 12A' component on each side of the beam 12" in the first pass are the same as those for the second pass above, the descriptions for the second pass are the same as those for the third pass above, and so on in the same manner.

To summarize, each component starting on each side of the beam in each pass returns to the rear mirror 13c as the opposite component at the opposite side of the beam, and starts as such from there in the next pass. Thus both components flip-flop from side to side with each successive pass, and any side to side nonuniformity is substantially eliminated.

A standard oscillator exhibits output beam angular nonuniformity due to pumping nonuniformities. Typical pump cavity configurations include a single ellipse cavity with the flashlamp at one focal axis of the cylindrical ellipse and the laser rod at the other. This geometry is efficient because rays from one focal axis intercept the other focal axis. However, most of the pump radiation strikes the side of the rod adjacent to the lamps. This nonuniformity can be partially smoothed by forming the pump cavity from multiple partial ellipses, each with a lamp, but there remains a scallop effect, and complexity of the cavity increases. Another typical configuration comprises a close coupled cavity without elliptical focusing. The highest pump intensity still occurs in the areas of the rod adjacent to the lamps.

The apparatus shown in FIG. 14 provides coherent radiation that is free from any angular nonuniformities except possibly a negligible amount. It contains all of the equipment shown in FIG. 12 plus a dove prism 30c in the closed paths 15c,17c,18c,19c,15c; 15c,19c,18c,17c,15c and a retarder plate 31c, preferably a quarterwave plate, between the rear mirror 13c and the laser rod 20c. The operation is the same as that described above for FIG. 12 except that the pattern of the laser beam in each pass instead of flip-flopping from the pattern of the preceding paths, rotates about its axis by at least a few degrees in the same direction from each pass to the next, and thus provides even greater uniformity of output than does the apparatus of FIG. 12.

The closed paths 15c,17c,18c,19c,15c; 15c,19c,18c,17c,15c lie in a plane (the plane of the paper in FIGS. 12 and 14) and the dove prism 30c is located with its axis along a portion of the closed paths and with the normal to its base at an angle away from the plane of the closed paths, as indicated at 32c. This causes each component of radiation 12A',12B' to proceed out of the plane of the closed paths and then back into it as it passes through the dove prism 30c, and thus causes the beam to rotate by an angle that is approximately twice the angle between the plane of the closed paths and the normal to the base of the dove prism. The fraction of the rotated beam that is directed by the polarizer 15c back through the rod 20c and the quarter wave plate 31c is reflected by the rear mirror 13c so that the component 12A',12B' that was directed down is reflected back up by the rear mirror 13c and thus passes through the quarter wave retarder plate 31c and the rod 20c a second time, so that the next radiation beam 12" is retarded by a half wavelength and thus each component 12A',12B' returns upward to the polarizer 15c as the same component as in the preceding pass around the closed paths. So with each pass around the closed paths the beam is rotated by the same amount and in the same direction, so that after several passes it has made a complete rotation and continues in the same manner, providing an extremely high degree of angular uniformity in the output beam.

The apparatus of FIG. 15 operates in the same manner with the combination 30'c of mirrors 34c,35c,36c in the closed paths instead of the dove prism 30c. The unit 30'c is positioned similarly to the dove prism 30c as described above. The unit 30'c is positioned so that the normal to each mirror 34c,35c,36c is at an angle, typically at least about 2.5 degrees, to the plane of the closed paths, and rotates each component 12A',12B' of the beam by twice that angle, as explained before for the dove prism 30c.

Major Components

An appendix filed with the application from which this patent issued, and present in the file of the application, lists the major components (and most of the other components) in an embodiment of the invention that includes most of the features in FIGS. 1 and 6 and has provided excellent results. The appendix also identifies the supplier and model number for each purchased component.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit or scope of the invention.

We claim:

1. Apparatus for improving properties of a solid material by providing shock waves therein, comprising means for providing a plurality of pulses of coherent radiation;

means for sharpening the leading edge of each pulse;

means for directing each pulse as a beam having a predetermined diameter onto amplifying means comprising first and second laser amplifier rods in series;

means for directing at least a major portion of the radiation amplified by the first amplifier rod to the second amplifier rod;

means for directing the radiation amplified by the second amplifier rod to a surface of the solid material; and means for providing substantially uniform spatial amplitude in the radiation directed to the surface of the solid material.

2. Apparatus as in claim 1, wherein the means for providing substantially uniform spatial amplitude in the radiation comprises the amplifying means;

the amplifying means includes with each laser amplifier rod a pair of flashlamps for pumping the rod, the axis of each flashlamp and the axis of the rod being substantially parallel to each other and substantially in the same plane; and the plane containing the axis of the second laser amplifier rod and the axes of its associated flashlamps is substantially perpendicular to the plane containing the axis of the first laser amplifier rod and the axes of its associated flashlamps.

3. Apparatus as in claim 1, comprising also means for directing a minor portion of the radiation amplified by the first amplifier rod to second amplifying means comprising third and fourth laser amplifier rods in series;

means for directing at least a major portion of the radiation amplified by the third amplifier rod to the fourth amplifier rod; and means for directing the radiation amplified by the fourth amplifier rod to a surface of the solid material;

and so on similarly for any desired number of additional similar amplifying means.

4. Apparatus as in claim 3, wherein each means for directing radiation to a surface of the solid material provides the radiation to the surface at an intensity of about 10 to 500 Joules per square centimeter.

5. Apparatus as in claim 3, wherein each means for directing radiation to a surface of the solid material directs its portion of the radiation substantially simultaneously to an area on the same surface that overlaps at least a portion of the area to which another said means directs its portion of the radiation.

6. Apparatus as in claim 5, wherein the optical path length of each beam is selected so as to provide the substantially simultaneous arrival at the surface by each portion of the radiation.

7. Apparatus as in claim 5, wherein each means for directing radiation to the same surface of the solid material directs its portion of the radiation to an area on the surface such that all of aid means together direct the total radiation approximately evenly over a continuous area.

8. Apparatus as in claim 3, wherein at least one of the means for directing radiation to a surface of the solid material directs its portion of the radiation substantially simultaneously to an area on a different surface of the solid material from the surface to which at least one other said means directs its portion of the radiation.

9. Apparatus as in claim 8, wherein said means for directing radiation to a surface of the solid material direct their respective portions of the radiation to areas that are substantially opposite to each other and on opposite sides of the solid material.

10. Apparatus as in claim 3, wherein
the means for providing substantially uniform spatial amplitude in the radiation comprises the amplifying means;
each amplifying means includes with each laser amplifier rod a pair of flashlamps for pumping the rod, the axis of each flashlamp and the axis of the rod being substantially parallel to each other and substantially in the same plane;
the plane containing the axis of the second laser amplifier rod and the axes of its associated flashlamps is substantially perpendicular to the plane containing the axis of the first laser amplifier rod and the axes of its associated flashlamps;
the plane containing the axis of the fourth laser amplifier rod and the axes of its associated flashlamps is substantially perpendicular to the plane containing the axis of the third laser amplifier rod and the axes of its associated flashlamps;
and so on similarly for any additional similar amplifying means.

11. Apparatus as in claim 1, wherein
the pulse providing means comprises a laser oscillator including a rod and a pair of flashlamps for pumping it, the axis of each flashlamp and the axis of the rod being substantially parallel to each other and substantially in the same plane; and a preamplifier including a rod and a pair of flashlamps for pumping it, the axis of each flashlamp and the axis of the rod being substantially parallel to each other and substantially in the same plane;
the means for providing substantially uniform spatial amplitude in the radiation comprises the laser oscillator and the preamplifier; and
the plane containing the axis of the preamplifier rod and the axes of its associated flashlamps is substantially perpendicular to the plane containing the axis of the oscillator rod and the axes of its associated flashlamps.

12. Apparatus as in claim 1, wherein the means for providing substantially uniform spatial amplitude in the radiation comprises the pulse providing means, and the pulse providing means comprises means for providing a beam of coherent radiation that is not polarized and in which each succeeding pulse is, in the spatial amplitude pattern of the beam, substantially a mirror image of the pattern in the pulse that preceded it.

13. Apparatus as in claim 12, wherein the means for providing a beam of coherent radiation comprises
a. laser means for providing a beam of unpolarized coherent radiation in a predetermined first direction;
b. polarizing means located in the path of the beam, for breaking down the radiation into two linearly polarized orthogonal components, transmitting one component through it in the first direction, and reflecting the other component from it in a predetermined second direction;
c. means for reflecting the component that was transmitted through the polarizing means, along a first closed path that ends in directing it back to the polarizing means in a predetermined third direction, opposite to the second direction, and for reflecting the component that was reflected from the polarizing means, along a second closed path that is opposite to the first closed path, and ends in directing it back to the polarizing means in a predetermined fourth direction, opposite to the first direction;
d. means located in the closed paths for retarding each component of the radiation by a predetermined fraction of a wavelength, a substantial fraction of the transmitted component being transformed into the opposite component before reaching the polarizing means, and a substantial fraction of the reflected component being transformed into the opposite component before again reaching the polarizing means;
e. the transformed transmitted component being reflected from the polarizing means in the fourth direction to the laser means to maintain oscillation therein, and the transformed reflected component being transmitted through the polarizing means in the fourth direction to the laser means to maintain oscillation therein;
f. the fraction of the transmitted component that remains not transformed being transmitted through the polarizing means in the third direction, and the fraction of the reflected component that remains not transformed being reflected from the polarizing means in the third direction; and
g. the two last mentioned components combining to form a beam of unpolarized useful output radiation that is directed in the third direction.

14. Apparatus as in claim 1, wherein the means for providing substantially uniform spatial amplitude in the radiation comprises the pulse providing means, and the pulse providing means comprises means for providing a beam of coherent radiation that is not polarized and in which each succeeding pulse is, in the spatial amplitude pattern of the beam, rotated about its axis by a predetermined angle from the pattern in the pulse that preceded it.

15. Apparatus as in claim 14, wherein the means for providing a beam of coherent radiation comprises
a. laser means for providing a beam of unpolarized coherent radiation in a predetermined first direction;
b. polarizing means located in the path of the beam, for breaking down the radiation into two linearly polarized orthogonal components, transmitting one component through it in the first direction, and reflecting the other component from it in a predetermined second direction;
c. means for reflecting the component that was transmitted through the polarizing means, along a first closed path that ends in directing it back to the polarizing means in a predetermined third direction, opposite to the second direction, and for reflecting the component that was reflected from the polarizing means, along a second closed path that is opposite to the first closed path, and ends in directing it back to the polarizing means in a predetermined fourth direction, opposite to the first direction;

d. means located in the closed paths for retarding each component of the radiation by a predetermined fraction of a wavelength, with a substantial fraction of the transmitted component being transformed into the opposite component before reaching the polarizing means, and a substantial fraction of the reflected component being transformed into the opposite component before again reaching the polarizing means;

e. the transformed transmitted component being reflected from the polarizing means in the fourth direction to the laser means to maintain oscillation therein, and the transformed reflected component being transmitted through the polarizing means in the fourth direction to the laser means to maintain oscillation therein;

f. the fraction of the transmitted component that remains not transformed being transmitted through the polarizing means in the third direction, and the fraction of the reflected component that remains not transformed being reflected from the polarizing means in the third direction; and g. the two last mentioned components combining to form a beam of unpolarized useful output radiation that is directed in the third direction;

h. means located in the closed paths for rotating the beam of radiation about its axis; and i. means in the laser means for retarding the radiation beam from each pass through the closed paths to the next pass therethrough by a predetermined fraction of a wavelength;

j. the radiation beam being thus rotated from each pass through the closed paths to the next pass therethrough by a predetermined angle.

16. Apparatus as in claim 1, wherein the means for sharpening the leading edge of each pulse comprises means for providing phase conjugation reflection of the radiation to limit the rise time of the pulse to not longer than about 5 nanoseconds.

17. Apparatus as in claim 16, wherein the means for providing phase conjugation reflection comprises a stimulated Brillouin scattering cell.

18. Apparatus as in claim 17, wherein the reflecting material in the stimulated Brillouin scattering cell comprises a liquid or a gas.

19. Apparatus as in claim 17, wherein the reflecting material in the stimulated Brillouin scattering cell comprises carbon tetrachloride, sulfur hexafluoride, methane, acetone, benzene, carbon disulfide, or ethylene glycol.

20. Apparatus as in claim 17, wherein the stimulated Brillouin scattering cell is in the oscillator cavity.

21. Apparatus as in claim 17, wherein the stimulated Brillouin scattering cell is external to the oscillator cavity.

22. Apparatus as in claim 21, wherein the means for providing phase conjugation reflecting comprises also means for providing Faraday rotation of the radiation.

23. Apparatus as in claim 16, wherein the means for providing phase conjugation reflection comprises a Faraday isolator and a stimulated Brillouin scattering cell.

24. Apparatus as in claim 1, wherein the diameter of each laser amplified rod is about 2 to 3 centimeters.

25. Apparatus as in claim 24, wherein the output fluence level in each amplifier rod is about 6 to 20 Joules per square centimeter.

26. Apparatus as in claim 1, wherein the components in the amplifier means affecting flashlamp efficiency, cavity transfer efficiency, quantum defect, quantum efficiency, and extraction efficiency are selected to provide substantially maximum overall efficiency therein.

27. Apparatus as in claim 26, wherein cerium is provided in the walls of the flashlamps to minimize the number of photons emitting with wavelengths substantially shorter than 0.85 micrometer, and krypton is provided in the flashlamps to minimize the number of photons emitting with wavelengths longer than about 0.85 micrometer, to confine the radiation from the flashlamps predominantly to a narrow range of wavelengths just less than about 0.85 micrometer.

28. Apparatus as in claim 26, wherein the amplifier rods comprise a material having an absorption cross-section of less than about $10^{-3}$ per centimeter and a stimulated emission cross-section of greater than about $4 \times 10^{-20}$ square centimeters.

29. Apparatus as in claim 28, wherein the amplifier rods comprise neodymium-doped glass.

30. Apparatus as in claim 29, wherein the concentration of neodymium in the amplifier rods is about 1.5 to 2.5 percent by weight.

* * * * *